United States Patent
Park et al.

(10) Patent No.: US 9,596,677 B2
(45) Date of Patent: Mar. 14, 2017

(54) METHOD AND DEVICE FOR TRANSMITTING/RECEIVING TRANSMISSION MODE INFORMATION ON USER TERMINAL IN INTER-BAND TDD TRANSMISSION SCHEME

(71) Applicant: Pantech Inc., Seoul (KR)

(72) Inventors: Dong Hyun Park, Seoul (KR); Kibum Kwon, Seoul (KR)

(73) Assignee: Pantech Inc., Seoul (KR)

( * ) Notice: Subject to any disclaimer, the term of this patent is extended or adjusted under 35 U.S.C. 154(b) by 96 days.

(21) Appl. No.: 14/360,565

(22) PCT Filed: Oct. 18, 2012

(86) PCT No.: PCT/KR2012/008524
§ 371 (c)(1),
(2) Date: May 23, 2014

(87) PCT Pub. No.: WO2013/077554
PCT Pub. Date: May 30, 2013

(65) Prior Publication Data
US 2014/0328228 A1 Nov. 6, 2014

(30) Foreign Application Priority Data
Nov. 25, 2011 (KR) ........................ 10-2011-0124642

(51) Int. Cl.
*H04W 72/04* (2009.01)
*H04B 7/26* (2006.01)
(Continued)

(52) U.S. Cl.
CPC ........ *H04W 72/042* (2013.01); *H04B 7/2615* (2013.01); *H04B 7/2656* (2013.01);
(Continued)

(58) Field of Classification Search
None
See application file for complete search history.

(56) References Cited

U.S. PATENT DOCUMENTS

2007/0041347 A1 2/2007 Beale et al.
2012/0094706 A1 4/2012 Fukumoto et al.
(Continued)

FOREIGN PATENT DOCUMENTS

CN 102075949 5/2011
CN 102986286 3/2013
(Continued)

OTHER PUBLICATIONS

Lin, U.S. Appl. No. 61/499,382, "systems and methods for different TDD configurations in carrier aggregations", Jun. 21, 2011, Media Tek Inc, pp. 1-40.*
International Search Report dated on Feb. 25, 2013 in International Patent Application No. PCT/KR2012/008524.
LG Electronics, "Solutions for Inter-band CA with Different TDD UU/DL Configurations", R1-113908, 3GPP TSG RAN WG1 Meeting #67 Nov. 14-18, 2011, San Francisco, US.
(Continued)

*Primary Examiner* — Kouroush Mohebbi
(74) *Attorney, Agent, or Firm* — H.C. Park & Associates, PLC

(57) ABSTRACT

The present invention relates to a method of receiving transmission mode information on a user terminal in an inter-band TDD transmission scheme. The present invention includes, at a base station controlling two or more bands with different time division duplex (TDD) settings, receiving a user terminal function information message that includes transmission mode function information on the user terminal in the two or more bands, and setting an element carrier aggregation environment of the user terminal to match the transmission mode function information, wherein the transmission mode function information includes information on whether the user terminal operates in a full duplex of half-duplex mode in the two or more bands.

12 Claims, 23 Drawing Sheets

(51) Int. Cl.
  *H04J 3/00*   (2006.01)
  *H04L 5/16*   (2006.01)
  *H04L 5/00*   (2006.01)
  *H04L 5/14*   (2006.01)

(52) U.S. Cl.
  CPC .............. *H04J 3/00* (2013.01); *H04L 5/0092* (2013.01); *H04L 5/16* (2013.01); *H04W 72/048* (2013.01); *H04L 5/001* (2013.01); *H04L 5/1469* (2013.01)

(56) References Cited

U.S. PATENT DOCUMENTS

| | | | |
|---|---|---|---|
| 2012/0327821 A1* | 12/2012 | Lin | ..................... H04W 72/048 370/280 |
| 2013/0051288 A1 | 2/2013 | Yamada et al. | |
| 2013/0279377 A1 | 10/2013 | Zhao et al. | |

FOREIGN PATENT DOCUMENTS

| | | |
|---|---|---|
| KR | 10-2010-0072064 | 6/2010 |
| WO | 2010-076376 | 7/2010 |
| WO | 2010/137259 | 12/2012 |
| WO | 2013/027395 | 2/2013 |

OTHER PUBLICATIONS

ETSI TS 136 306v10.2.0, "LTE;E-UTRA; User Equipment(UE) radio access capabilities(3GPP TS 36.306 version 10.2.0 Release 10)", Jun. 2011, France.

LG Electronics, "Overall structure of TDD CA with different UL-DL configurations based on half-duplex operation", R1-113973, 3GPP TSG RAN WG1 #67 Nov. 14-18, 2011, San Francisco, US.

Renesas Electronics Europe, "Operation Principles of CC specific TDD Configuration", R2-111983 3GPP TSG-RAN WG2 Meeting #73bis, Apr. 11-15, 2011, Shanghai, China.

Qualcomm Inorporated, "Separate UE capability for FDD and TDD", R2-113059 3GPP TSG-RAN WG2 Meeting #74, May 9-13, 2011, Barcelona, Spain.

Qualcomm Inorporated, "Separate UE capability for FDD and TDD", R2-111868 3GPP TSG-RAN WG2 Meeting #73bis, Apr. 11-15, 2011, Shanghai, China.

Extended European Search Report issued on May 8, 2015, in European Patent Application No. 12851569.9.

CATT, "TDD Inter-band Carrier Aggregation", R2-116024 3GPP TSG RAN WG2 Meeting #76, Nov. 14-18, 2011, San Francisco, CA.

Samsung, "Discussion on FGI bit handling for FDD/TDD dual mode UE", R2-114177 3GPP TSG-RAN2 #75 Meeting, Aug. 22-26, 2011, Athens, Greece.

* cited by examiner

| FULL/HALF DUPLEX | UE CATEGORY | MAX # OF DL-SCH TB BITS RECEIVED WITHIN A TTI | MAX # OF BITS OF A DL-SCH TB RECEIVED WITHIN A TTI | TOTAL NUMBER OF SOFT CHANNEL BITS | MAX # OF SUPPORTED LAYERS FOR SPATIAL MULTIPLEXING IN DL | MAX # OF UL-SCH TB BITS TRANSMITTED WITHIN A TTI | MAX # OF BITS OF AN UL-SCH TB TRANSMITTED WITHIN A TTI | SUPPORT FOR 64QAM IN UL | TOTAL LAYER 2 BUFFER SIZE [BYTES] | MAX # OF BITS OF A MCH TB RECEIVED WITHIN A TTI |
|---|---|---|---|---|---|---|---|---|---|---|
| FULL-DUPLEX | CATEGORY 1 | 10296 | 10296 | 250368 | 1 | 5160 | 5160 | NO | 150 000 | 10296 |
| | CATEGORY 2 | 51024 | 51024 | 1237248 | 2 | 25456 | 25456 | NO | 700 000 | 51024 |
| | CATEGORY 3 | 102048 | 75376 | 1237248 | 2 | 51024 | 51024 | NO | 1 400 000 | 75376 |
| | CATEGORY 4 | 150752 | 75376 | 1827072 | 2 | 51024 | 51024 | NO | 1 900 000 | 75376 |
| | CATEGORY 5 | 299552 | 149776 | 3667200 | 4 | 75376 | 75376 | YES | 3 500 000 | 75376 |
| | CATEGORY 6 | 301504 | 149776 (4 L) 75376 (2 L) | 3654144 | 2 OR 4 | 51024 | 51024 | NO | 3 300 000 | (75376 TBD) |
| | CATEGORY 7 | 301504 | 149776 (4 L) 75376 (2 L) | 3654144 | 2 OR 4 | 102048 | 51024 | NO | 3 800 000 | (75376 TBD) |
| | CATEGORY 8 | 2998560 | 299856 | 35982720 | 8 | 1497760 | 149776 | YES | 42 200 000 | (75376 TBD) |
| HALF-DUPLEX | CATEGORY 9 | 10296 | 10296 | 250368 | 1 | 5160 | 5160 | NO | 150 000 | 10296 |
| | CATEGORY 10 | 51024 | 51024 | 1237248 | 2 | 25456 | 25456 | NO | 700 000 | 51024 |
| | CATEGORY 11 | 102048 | 75376 | 1237248 | 2 | 51024 | 51024 | NO | 1 400 000 | 75376 |
| | CATEGORY 12 | 150752 | 75376 | 1827072 | 2 | 51024 | 51024 | NO | 1 900 000 | 75376 |
| | CATEGORY 13 | 299552 | 149776 | 3667200 | 4 | 75376 | 75376 | YES | 3 500 000 | 75376 |
| | CATEGORY 14 | 301504 | 149776 (4 L) 75376 (2 L) | 3654144 | 2 OR 4 | 51024 | 51024 | NO | 3 300 000 | (75376 TBD) |
| | CATEGORY 15 | 301504 | 149776 (4 L) 75376 (2 L) | 3654144 | 2 OR 4 | 102048 | 51024 | NO | 3 800 000 | (75376 TBD) |
| | CATEGORY 16 | 2998560 | 299856 | 35982720 | 8 | 1497760 | 149776 | YES | 42 200 000 | (75376 TBD) |

* 4 L, 2L : 4 LAYERS, 2 LAYERS    MAX #: MAXIMUM NUMBER   * TB: TRANSPORT BLOCK (B)

| UE CATEGORY | MAX # OF DL-SCH TB BITS RECEIVED WITHIN A TTI | MAX # OF BITS OF A DL-SCH TB RECEIVED WITHIN A TTI | TOTAL NUMBER OF SOFT CHANNEL BITS | MAX # OF SUPPORTED LAYERS FOR SPATIAL MULTIPLEXING IN DL | MAX # OF UL-SCH TB BITS TRANSMITTED WITHIN A TTI | MAX # OF BITS OF AN UL-SCH TB TRANSMITTED WITHIN A TTI | SUPPORT FOR 64QAM IN UL | TOTAL LAYER 2 BUFFER SIZE [BYTES] | MAX # OF BITS OF A MCH TB RECEIVED WITHIN A TTI | SUPPORT FOR FULL-DUPLEX FOR INTERBAND CA |
|---|---|---|---|---|---|---|---|---|---|---|
| CATEGORY 1 | 10296 | 10296 | 250368 | 1 | 5160 | 5160 | NO | 150 000 | 10296 | NO |
| CATEGORY 2 | 51024 | 51024 | 1237248 | 2 | 25456 | 25456 | NO | 700 000 | 51024 | NO |
| CATEGORY 3 | 102048 | 75376 | 1237248 | 2 | 51024 | 51024 | NO | 1 400 000 | 75376 | NO |
| CATEGORY 4 | 150752 | 75376 | 1827072 | 2 | 51024 | 51024 | NO | 1 900 000 | 75376 | NO |
| CATEGORY 5 | 299552 | 149776 | 3667200 | 4 | 75376 | 75376 | YES | 3 500 000 | 75376 | NO |
| CATEGORY 6 | 301504 | 149776 (4 L) 75376 (2 L) | 3654144 | 2 OR 4 | 51024 | 51024 | NO | 3 300 000 | (75376 TBD) | NO |
| CATEGORY 7 | 301504 | 149776 (4 L) 75376 (2 L) | 3654144 | 2 OR 4 | 102048 | 51024 | NO | 3 800 000 | (75376 TBD) | NO |
| CATEGORY 8 | 2998560 | 299856 | 35982720 | 8 | 1497760 | 149776 | YES | 42 200 000 | (75376 TBD) | NO |
| CATEGORY 9 | 10296 | 10296 | 250368 | 1 | 5160 | 5160 | NO | 150 000 | 10296 | YES |
| CATEGORY 10 | 51024 | 51024 | 1237248 | 2 | 25456 | 25456 | NO | 700 000 | 51024 | YES |
| CATEGORY 11 | 102048 | 75376 | 1237248 | 2 | 51024 | 51024 | NO | 1 400 000 | 75376 | YES |
| CATEGORY 12 | 150752 | 75376 | 1827072 | 2 | 51024 | 51024 | NO | 1 900 000 | 75376 | YES |
| CATEGORY 13 | 299552 | 149776 | 3667200 | 4 | 75376 | 75376 | YES | 3 500 000 | 75376 | YES |
| CATEGORY 14 | 301504 | 149776 (4 L) 75376 (2 L) | 3654144 | 2 OR 4 | 51024 | 51024 | NO | 3 300 000 | (75376 TBD) | YES |
| CATEGORY 15 | 301504 | 149776 (4 L) 75376 (2 L) | 3654144 | 2 OR 4 | 102048 | 51024 | NO | 3 800 000 | (75376 TBD) | YES |
| CATEGORY 16 | 2998560 | 299856 | 35982720 | 8 | 1497760 | 149776 | YES | 42 200 000 | (75376 TBD) | YES |

* 4 L, 2L : 4 LAYERS, 2 LAYERS    MAX #: MAXIMUM NUMBER   * TB: TRANSPORT BLOCK

FIG.10

```
RF-Parameters-v11xx ::= SEQUENCE {
    supportedBandCombination-r11   SupportedBandCombination-r11
}
SupportedBandCombination-r11 ::= SEQUENCE (SIZE (1..maxBandComb-r11)) OF BandCombinationParameters-r11
BandCombinationParameters-r11 ::= SEQUENCE (SIZE (1..maxSimultaneousBands-r11)) OF BandParameters-r11
```
*1010*

```
BandParameters-r11 ::= SEQUENCE {
    bandEUTRA-r11          INTEGER (1..64),
    bandParametersUL-r11   BandParametersUL-r11    OPTIONAL,
    bandParametersDL-r11   BandParametersDL-r11    OPTIONAL
}
```
*1020*

```
BandParametersUL-r11 ::= SEQUENCE (SIZE (1..maxBandwidthClass-r11)) OF CA-MIMO-ParametersUL-r11
CA-MIMO-ParametersUL-r11 ::= SEQUENCE {
    ca-BandwidthClassUL-r11        CA-BandwidthClass-r11,
    supportedMIMO-CapabilityUL-r11 MIMO-CapabilityUL-r11          OPTIONAL
    ca-SimultaneousTxRx-CapabilityUL-r11  CA-SimultaneousTxRx-r11  OPTIONAL
}
```
*1030*

```
BandParametersDL-r11 ::= SEQUENCE (SIZE (1..maxBandwidthClass-r11)) OF CA-MIMO-ParametersDL-r11
CA-MIMO-ParametersDL-r11 ::= SEQUENCE {
    ca-BandwidthClassDL-r11        CA-BandwidthClass-r11,
    supportedMIMO-CapabilityDL-r11 MIMO-CapabilityDL-r11          OPTIONAL
    ca-SimultaneousTxRx-CapabilityDL-r11  CA-SimultaneousTxRx-r11  OPTIONAL
}
```

```
CA-BandwidthClass-r10 ::= ENUMERATED {a, b, c, d, e, f, ...}
CA-SimultaneousTxRx-r11 ::= ENUMERATED {Half duplex, Full duplex}
MIMO-CapabilityUL-r10 ::= ENUMERATED {twoLayers, fourLayers}
MIMO-CapabilityDL-r10 ::= ENUMERATED {twoLayers, fourLayers, eightLayers}
```
*1040*

METHOD AND DEVICE FOR TRANSMITTING/RECEIVING TRANSMISSION MODE INFORMATION ON USER TERMINAL IN INTER-BAND TDD TRANSMISSION SCHEME

CROSS-REFERENCE TO RELATED APPLICATIONS

This application is the National Stage Entry of International Application PCT/KR2012/008524, filed on Oct. 18, 2012, and claims priority from and the benefit of Korean Patent Application No. 10-2011-0124642, filed on Nov. 25, 2011 all of which are hereby incorporated by reference for all purposes as if fully set forth herein.

BACKGROUND

Field

The present invention relates to a method and apparatus for transmitting and receiving transmission mode information of a user equipment in an inter-band TDD transmission mode. That is, a method for providing a base station or an apparatus that executes a function of a base station with information associated with whether a transmission mode of a user equipment that executes TDD transmission in different bands is a half-duplex transmission mode or a full-duplex transmission mode, and apparatuses implementing the same, wherein a TDD transmission mode is different in each band.

Discussion of the Background

As communication systems have developed, various wireless terminals have been utilized by consumers, such as companies and individuals. A current mobile communication system affiliated with 3GPP, for example, LTE (Long Term Evolution), LTE-A (LTE-Advanced), and the like, may be a high capacity communication system capable of transmitting and receiving various data, such as image data, wireless data, and the like, beyond providing a sound-based service. Accordingly, there is a desire for a technology that transmits high capacity data which is comparable to a wired communication network. Data may be efficiently transmitted through a plurality of component carriers as a scheme for transmitting high capacity data. A TDD (Time Division Duplex) system uses a predetermined frequency band for transmission (Tx) and Reception (Rx), and may transmit and receive data based on a time slot. In this example, a timing that transmits response information in response to data transmission and reception may be changed based on a scheme of setting an uplink (UL) and a downlink (DL) in the TDD system.

In a multiple carrier aggregation (Carrier Aggregation, or carrier coupling, "CA") environment, in which one or more component carriers (CC) are coupled, a band where each component carrier belongs may be different from one another. That is, in a case in which carriers are coupled based on an inter-band scheme, when TDD configurations of each band are different from one another, a transmission and reception subframe may be limited based on a transmission mode of a user equipment. However, currently, a mechanism that shares the transmission mode of a user equipment has not been provided.

SUMMARY

Under an inter-band CA, when carrier-aggregated component carriers are in different TDD configurations and a conflicting subframe exists, whether or not the component carriers are to be muted in the conflicting subframe and a transmission and reception scheme may be determined based on whether the transmission mode of the user equipment is a full-duplex mode or a half-duplex mode. Signaling of information associated with the transmission mode of the user equipment may be executed between a base station and a user equipment.

In accordance with an aspect of the present invention, here is provided a method of receiving transmission mode information of a user equipment in an inter-band TDD transmission mode, of a base station that controls two or more bands set in different TDD (Time Division Duplex) configurations, the method including: transmitting, to a user equipment, a message for requesting a capability of the user equipment; receiving a user equipment capability information message, including transmission mode capability information of the user equipment in the two or more bands, in response to the message from the user equipment; and setting, by the base station, a component carrier aggregation environment of the user equipment to correspond with the transmission mode capability information, wherein the transmission mode capability information includes information associated with whether the user equipment operates in a full-duplex mode or a half-duplex mode in the two or more bands.

In accordance with another aspect of the present invention, there is provided a method of transmitting transmission mode information of a user equipment in an inter-band TDD transmission mode, of the user equipment, the method including: receiving a message for requesting a capability of the user equipment, from a network or a base station that controls two or more bands set in different TDD (Time Division Duplex) configurations; generating a user equipment capability information message including transmission mode capability information of the user equipment in the two or more bands; and transmitting the user equipment capability information message to the network or base station, in response to the message, wherein the transmission mode capability information includes information associated with whether the user equipment operates in a full-duplex mode or a half-duplex mode, in the two or more bands.

In accordance with another aspect of the present invention, there is provided an apparatus for receiving transmission mode information of a user equipment in an inter-band TDD transmission mode, of a base station that controls two or more bands set in different TDD (Time Division Duplex) configurations, the apparatus including: a transmitting unit for transmitting, to a user equipment, a message for requesting a function of the user equipment; a receiving unit for receiving, from the user equipment, a user equipment capability information message including transmission mode capability information of the user equipment in two or more bands, in response to the message; and a controller for setting a component carrier aggregation environment of the user equipment to correspond with the transmission mode capability information, wherein the transmission mode capability information includes information associated with whether the user equipment operates in a full-duplex mode or a half-duplex mode in two or more bands.

In accordance with another aspect of the present invention, there is provided an apparatus for transmitting transmission mode information of a user equipment in an inter-band TDD transmission mode, of the user equipment, the apparatus including: a receiving unit for receiving a message for requesting a capability of the user equipment from a network or a base station that controls two or more bands set in different TDD (Time Division Duplex) configurations; a controller for generating a user equipment capability information message including transmission mode capability information of the user equipment in the two or more bands; and a transmitting unit for transmitting the user equipment capability information message to the network or base station, in response to the message, wherein the transmission mode capability information includes information associated with whether the user equipment operates in a full-duplex mode or a half-duplex mode in the two or more bands.

BRIEF DESCRIPTION OF THE DRAWINGS

FIG. 8 is a diagram illustrating a set value for adjusting a UE-Category value in a UE Capability Information IE and setting a transmission mode, according to another embodiment of the present invention;

FIG. 10 illustrates an example of including supportable transmission mode information of a UE in RF-Parameters-v11xx of FIG. 9;

FIG. 15, is a diagram illustrating an example of transmitting information associated with whether a transmission mode, among the capabilities of a UE, is a full-duplex mode or a half-duplex mode in an inter-band CA environment as shown in FIGS. 9 and 10, using band information in a "supportedBandCombination-r11" field;

DETAILED DESCRIPTION OF THE ILLUSTRATED EMBODIMENTS

Figure 1:
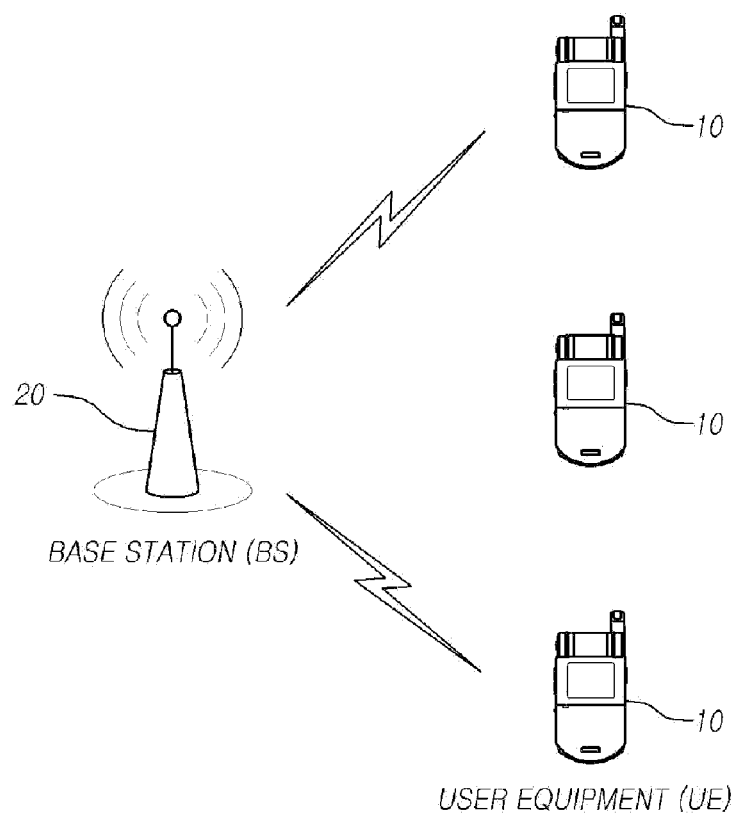
FIG. 1 illustrates a wireless communication system according to embodiments of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a wireless communication system according to embodiments of the present invention.

The wireless communication system may be widely installed so as to provide various communication services, such as a voice service, packet data, and the like.

Referring to FIG. 1, the wireless communication system may include a User Equipment (UE) 10 and a Base Station (BS or eNB) 20. Throughout the specifications, the user equipment 10 may be an inclusive concept indicating a terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

The base station 20, or a cell, may generally refer to a station where communication with the user equipment 10 is performed, and may also be referred to as a Node-B, an eNB (evolved Node-B), a Sector, a Site, a BTS (Base Transceiver System), an Access Point, a Relay Node, and the like.

That is, the base station 20, or the cell, may be construed as an inclusive concept indicating a portion of an area or a function covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specifications, the user equipment 10 and the base station 20 are used as two inclusive transceiving subjects to embody the technology and technical concepts described in the specifications, and may not be limited to a predetermined term or word. The user equipment 10 and the base station 20 are used as two (uplink or downlink) inclusive transceiving subjects to embody the technology and technical concepts described in the specifications, and may not be limited to a predetermined term or word. Here, the Uplink (UL) refers to a scheme of performing transmission and reception of data by the user equipment 10 with respect to the base station 20, and Downlink (DL) refers to a scheme of performing transmission and reception of data by the base station 20 with respect to the user equipment 10.

Varied multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

In a system such as LTE and LTE-A, a standard may be developed by forming an uplink and a downlink based on a single carrier or a pair of carriers. The uplink and the downlink may transmit control information through a control channel, such as a PDCCH (Physical Downlink Control CHannel), PCFICH (Physical Control Format Indicator CHannel), PHICH (Physical Hybrid ARQ Indicator CHannel), PUCCH (Physical Uplink Control CHannel), and the like, and may be configured as a data channel, such as PDSCH (Physical Downlink Shared CHannel), PUSCH (Physical Uplink Shared CHannel), and the like, so as to transmit data.

Meanwhile, a timepoint of a downlink and a timepoint of an uplink may be distinguished in TDD, and when various TDD configurations exist, timepoints may be varied.

Table 1 below shows TDD configurations. It shows that each TDD configuration has a different UL-DL subframe transmission timing.

TABLE 1

| Uplink-downlink configurations | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ins | D | S | U | D | D | D | D | D | D | D |
| 6 | 5 ms | D | S | U | U | U | D | S | U | U | D |

In table 1, in a radio frame corresponding to 10 subframes, a region marked by D refers to a downlink and a region marked by U refers to an uplink. S is a subframe that is switched from a downlink to an uplink (Downlink-to-Uplink Switch-point periodicity).

When one of the TDD configurations is used, a user equipment may know in advance whether a downlink or an uplink comes at a corresponding timepoint. The information enables the user equipment to execute a prediction and to operate.

Meanwhile, a TDD configuration may be set to be different for each band. The component carriers included in the bands having different TDD configurations may use a single user equipment.

Figure 2:
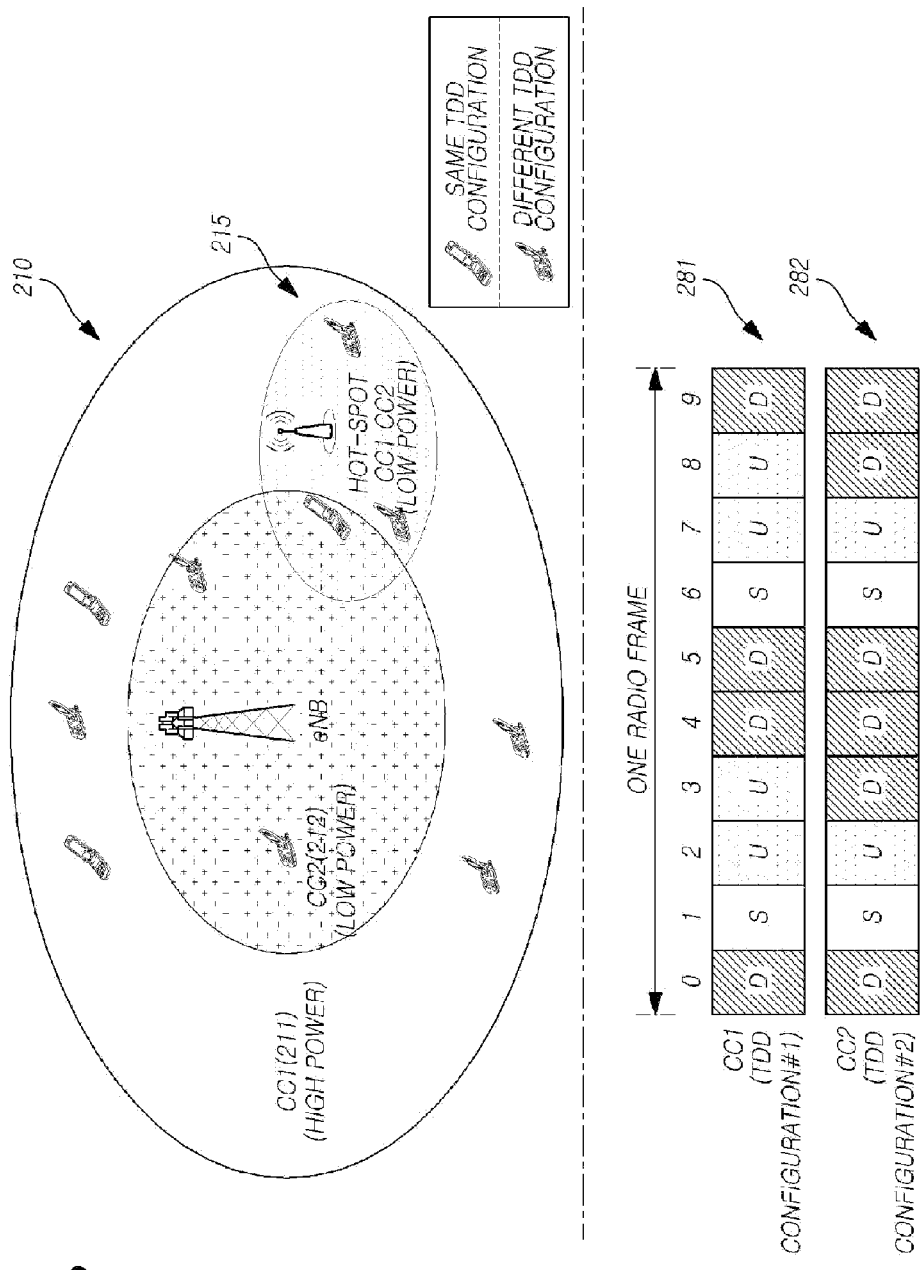
FIG. 2 is a diagram illustrating an inter-band CA environment according to an embodiment of the present invention.

FIG. 2 illustrates an inter-band CA environment according to an embodiment of the present invention.

The diagram 210 shows that two component carriers are configured, and a CC1 211 is a carrier having a coverage corresponding to a high power signal transmitted from an eNB, and a CC2 212 is a carrier having a coverage corresponding to a low power signal transmitted from an eNB.

The CC1 211 and the CC2 212 are included in different bands. A TDD configuration of the CC1 211 is 1 as shown in the diagram 281, and a TDD configuration of the CC2 212 is 2 as shown in the diagram 282. The diagram 215 corresponds to a hot-spot region, and is formed of a CA environment of the CC1 212 and the CC2 212. Also, the diagram 210 may form a CA for UEs included in a CC2 coverage.

Here, a user equipment that communicates with the hot-spot 215 may have different TDD configurations such as the CC1 211 and the CC2 212, and an uplink subframe and a downlink subframe of a few subframes may be set to be different for each component carrier.

In this example, an operation mode may be different for each subframe based on whether a transmission mode supported by a user equipment is a half-duplex or a full duplex.

Figure 3:
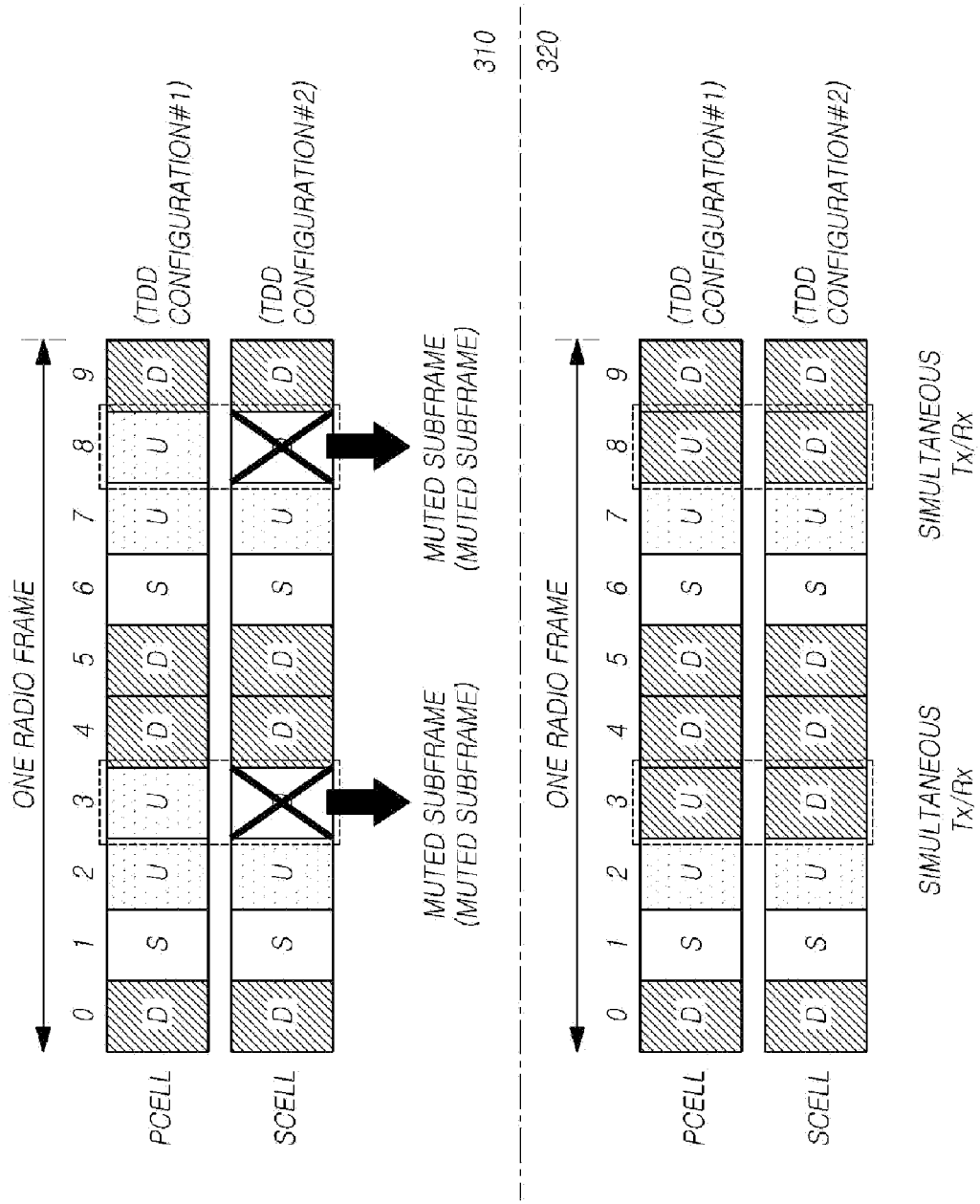
FIG. 3 is a diagram illustrating an operation mode for each subframe based on the transmission mode of a user equipment under the inter-band CA environment of FIG. 2.

FIG. 3 is a diagram illustrating an operation mode for each subframe based on a transmission mode of a user equipment under the inter-band CA environment of FIG. 2. It is the case in which a CC1 is a PCell (Primary Cell) and a CC2 is an SCell (Secondary Cell).

The diagram 310 of FIG. 3 shows that only an uplink subframe of a PCell operates in 3rd and 8th subframes of a radio frame and a downlink subframe of an SCell does not operate. That is, 3rd and 8th subframes of the SCell operate as muted subframes when a user equipment supports only the half-duplex transmission mode. In the diagram 310, the half-duplex transmission motion is used so that a downlink or an uplink operates in one of the subframes in which a downlink and an uplink conflict.

Conversely, the diagram 320 shows that both the uplink subframe of the PCell and the downlink subframe of the SCell operate in the 3rd and 8th subframes of the radio frame when the user equipment supports only the full-duplex transmission mode. That is, the full-duplex transmission mode simultaneously implements transmission and reception (Simultaneous Tx/Rx) and thus, an uplink/downlink may be implemented in the PCell and the Scell, respectively. In the diagram 320, the full-duplex transmission mode operates even in the subframe where the downlink and the uplink conflict and thus, both a downlink subframe and an uplink subframe may operate.

Figure 4:
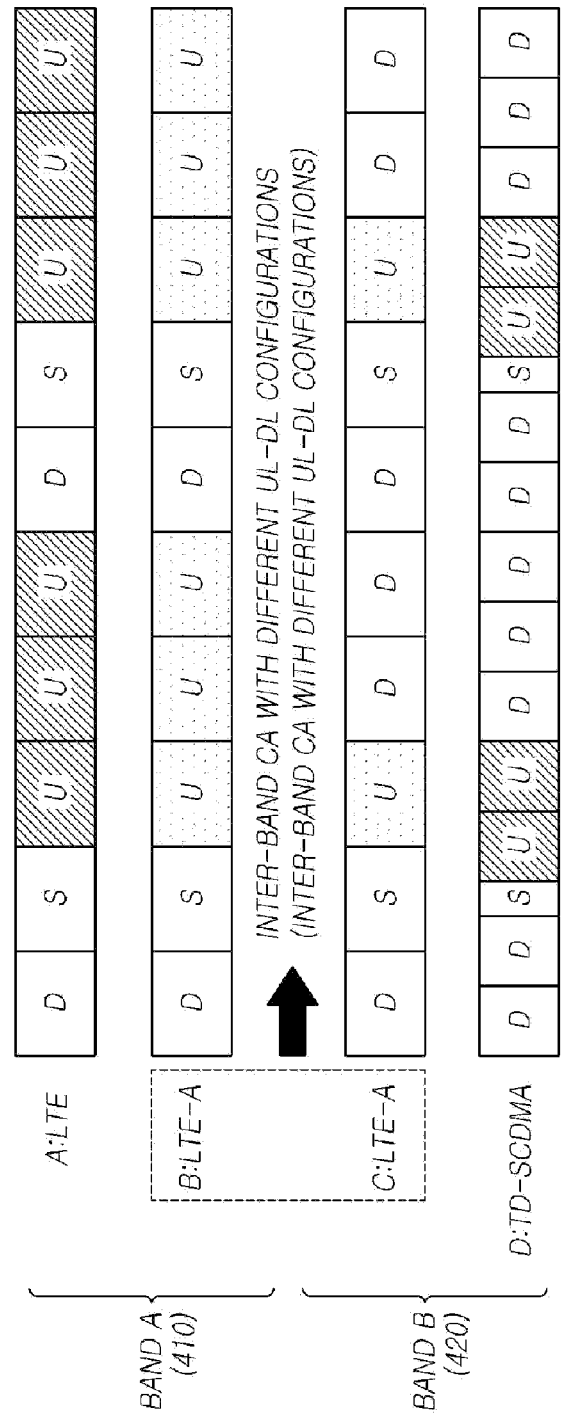
FIG. 4 is a diagram illustrating a CA of bands that have different TDD configurations according to an embodiment of the present invention.

FIG. 4 is a diagram illustrating a CA between bands that have different TDD configurations according to an embodiment of the present invention.

The TDD configurations may be set to be identical or not to generate a conflict in a Band A 410 and a Band B 420. Therefore, a component carrier a of the Band A 410 operates in the LTE scheme and based on a TDD configuration 1 (TDD configuration #1), and a component carrier b operates in the LTE-A scheme and based on a TDD configuration 1. A component carrier c of the Band B 420 operates in the LTE-A scheme and based on the TDD configuration 2. Meanwhile, a component carrier d of the Band B 420 operates in a TD-SCDMA scheme. An identical TDD UL-DL may be set in an identical band, or a band may be configured not to generate a conflict, such as component carriers c and d.

In this instance, in the case of a user equipment that uses the component carriers b and c as a CA, the TDD configurations may be different from one another (inter-band CA with different UL-DL configurations), and the user equipment may have a few subframes muted as shown in FIG. 3 or may execute simultaneous transmission and reception (simultaneous Tx/Rx), based on whether a half-duplex transmission mode or a full-duplex transmission mode is supported.

Therefore, a user equipment may determine whether a performance supported by the corresponding user equipment is the half-duplex transmission mode or the full-duplex transmission mode in the inter-band CA environment, so as to determine a transmission mode based on the determined performance, thereby increasing efficiency. To this end, the present specifications will provide a scheme of providing a network with supportable transmission mode information of a user equipment which is supported when the user equipment connects or couples to the network.

Hereinafter, the present specifications will describe a process in which a user equipment that supports a half-duplex transmission mode or a full-duplex transmission mode provides supportable transmission mode information. As described above, when different TDD transmission modes are set in different bands (different TDD configuration) in a TDD system, the information may be useful.

As described in FIG. 4, in a case in which a conflicting subframe is generated since an uplink/downlink conflict due to different TDD UL-DL configurations, simultaneous transmission and reception may be executed when a transmission mode of a user equipment is a full duplex mode, and transmission may be executed in one of an uplink and a downlink in the conflicting subframe when the transmission mode of the user equipment is the half-duplex mode.

Also, when a user equipment is coupled to a network, information associated with the same may be provided to the network or a base station (eNB).

Figure 5:
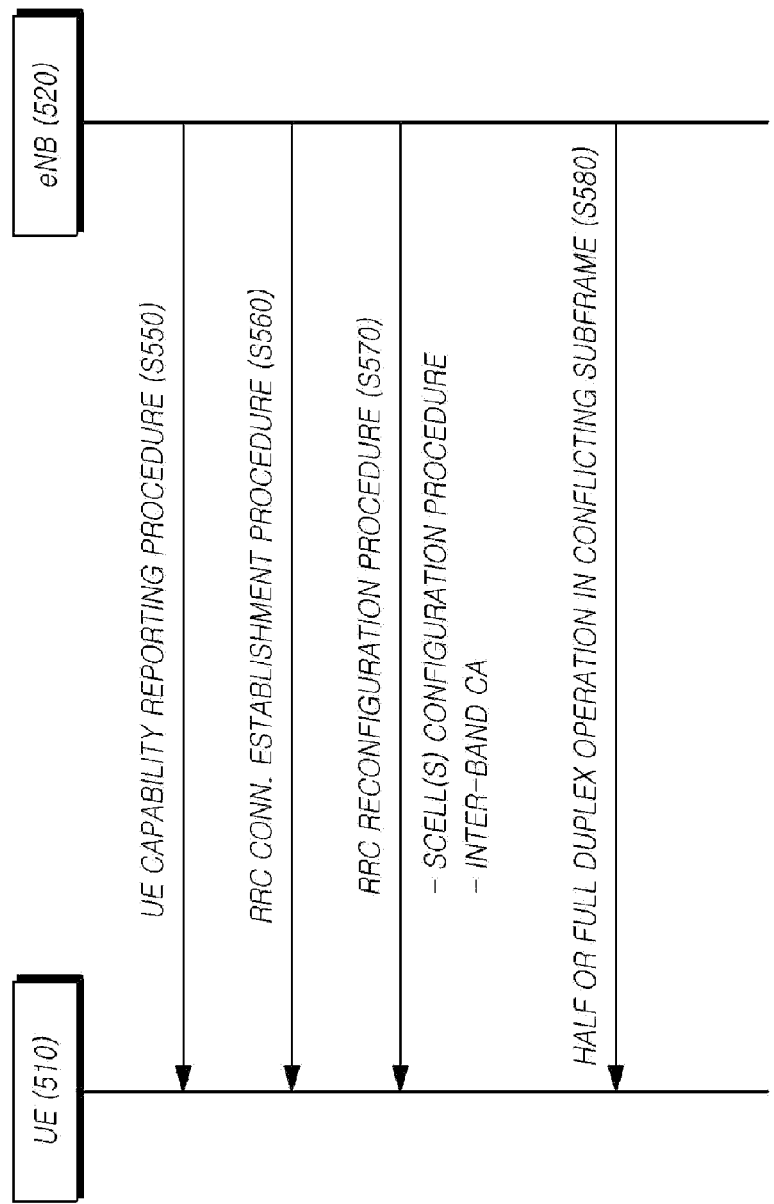
FIG. 5 illustrates a process in which a user equipment provides information associated with the capability of the user equipment to a base station, and executes RRC(Radio Resource Control) connection, according to an embodiment of the present invention.

FIG. 5 illustrates a process in which a user equipment provides information associated with the capability of the user equipment to a base station, and executes RRC(Radio Resource Control) connection, according to an embodiment of the present invention. In FIG. 5, descriptions will be provided using an eNB 520 as an example of a base station and a UE 510 as an example of a user equipment.

The UE 510 and the eNB 520 execute a process of reporting a capability of the UE 510 (UE Capability Reporting Procedure) in operation S550. In the process, the eNB 520 determines which capability the UE 510 operates in a network, and a full duplex/half duplex transmission mode provided in the present specifications may be included in the capabilities. The eNB 520 executes RRC connection (RRC CONN. Establishment Procedure) based on information associated with the UE 510 obtained in operation S550, in operation S560. In the process, a PCell may be set. Subsequently, the eNB executes an RRC reconfiguration procedure in operation S570 such as adding an SCell (SCell(s) Configuration Procedure) or executing an inter-band CA. In this instance, in the case of the inter-band CA, transmission may be executed based on the full-duplex mode or the half-duplex mode in a conflicting subframe based on the information associated with the transmission mode of the UE 510, obtained in operation S550, in operation S580.

Operation S550 of FIG. 5 is a process in which the UE 510 transmits its capability to the eNB 520 in response to a request from the eNB 520 before the RRC connection establishment of operation S560 begins. That is, in the present specifications, the information associated with the transmission mode of the UE 510 is provided to the eNB 520 in operation S550 and thus, the UE efficiently transmits and receives a signal in the inter-band CA environment of the TDD system, based on the half-duplex or full-duplex transmission mode in the conflicting subframe.

Figure 6:
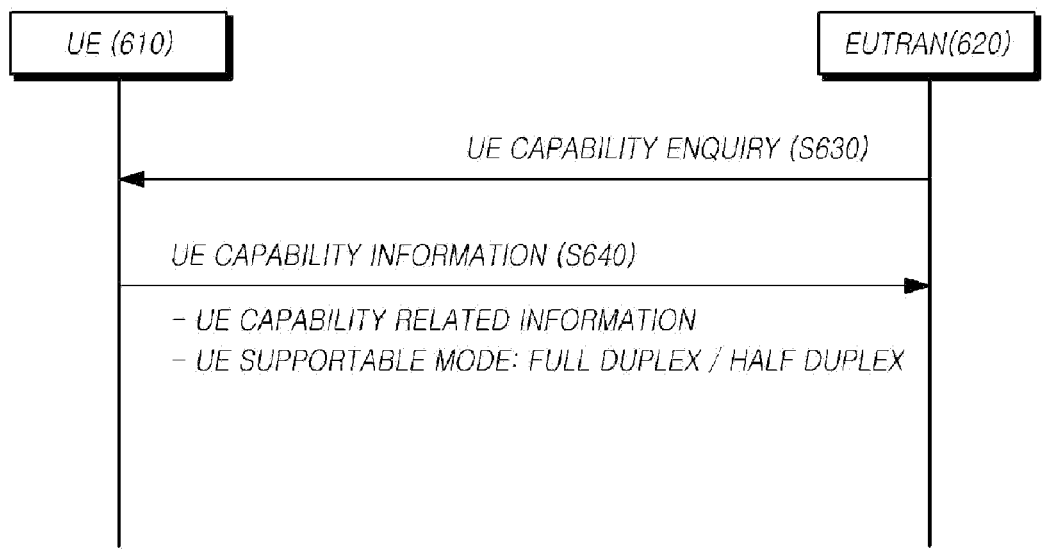
FIG. 6 illustrates a process in which a user equipment provides information associated with the user equipment to a network when the user equipment connects or couples to the network, according to an embodiment of the present invention.

A signaling flow for a half-duplex transmission mode or a full-duplex transmission mode of a predetermined user equipment in operation S550 of FIG. 5 is as shown in FIG. 6.

FIG. 6 illustrates a process in which a user equipment provides information associated with the user equipment to a network when the user equipment connects or couples to the network, according to an embodiment of the present invention. FIG. 6 illustrates the operation S550 of FIG. 5 in more detail, and shows an embodiment of the present invention that provides transmission mode information of a UE together. A UE 610 corresponding to a user equipment is requested to provide information associated with its capability from an EUTRAN (Evolved UMTS Terrestrial Radio Access Network) 620 which is a network, in operation S630. This may be executed through receiving a message named UECapabilityEnquiry, and subsequently, the user equipment provides information associated with the supportable capability of the user equipment through a message named UECapabilityInformation, in operation S640.

Operation S640 shows an embodiment that includes information associated with a UE capability and a transmission mode (half/full duplex) in the UECapabilityInformation message.

The user equipment includes the information associated with the transmission mode in the UE-EUTRA-Capability message and reports the capability of the corresponding UE in advance to the eNB as shown in the operation S550 of FIG. 5, so that a transmission mode may operate to be appropriate for the performance of the user equipment in a subframe in which an uplink/downlink conflict in different TDD configurations of the inter-band CA.

Information associated with a transmission mode is to be included in an UECapabilityInformation IE (Information Element) included in a message transmitted by the UE 610 in the procedure of operation S640 of the signaling flow of FIG. 6.

Hereinafter, the present specifications will describe a scheme of including the information associated with a transmission mode in a message that a UE transmits to an eNB.

Hereinafter, an UECapabilityInformation IE may be used as an example of a user equipment capability information structure to which transmission mode information is to be included. Also, the transmission mode information to be described below refers to a transmission mode that is to be supported by a user equipment when the TDD configurations are different in the inter-band CA. Although a user equipment may support a full-duplex transmission mode, the user equipment may adopt a half-duplex transmission mode when the TDD configurations are different in the inter-band CA. In this instance, although the corresponding user equipment corresponds to the full-duplex transmission mode, the user equipment operates in the half-duplex transmission mode when the TDD is set to be different in the inter-band CA.

Figure 7:
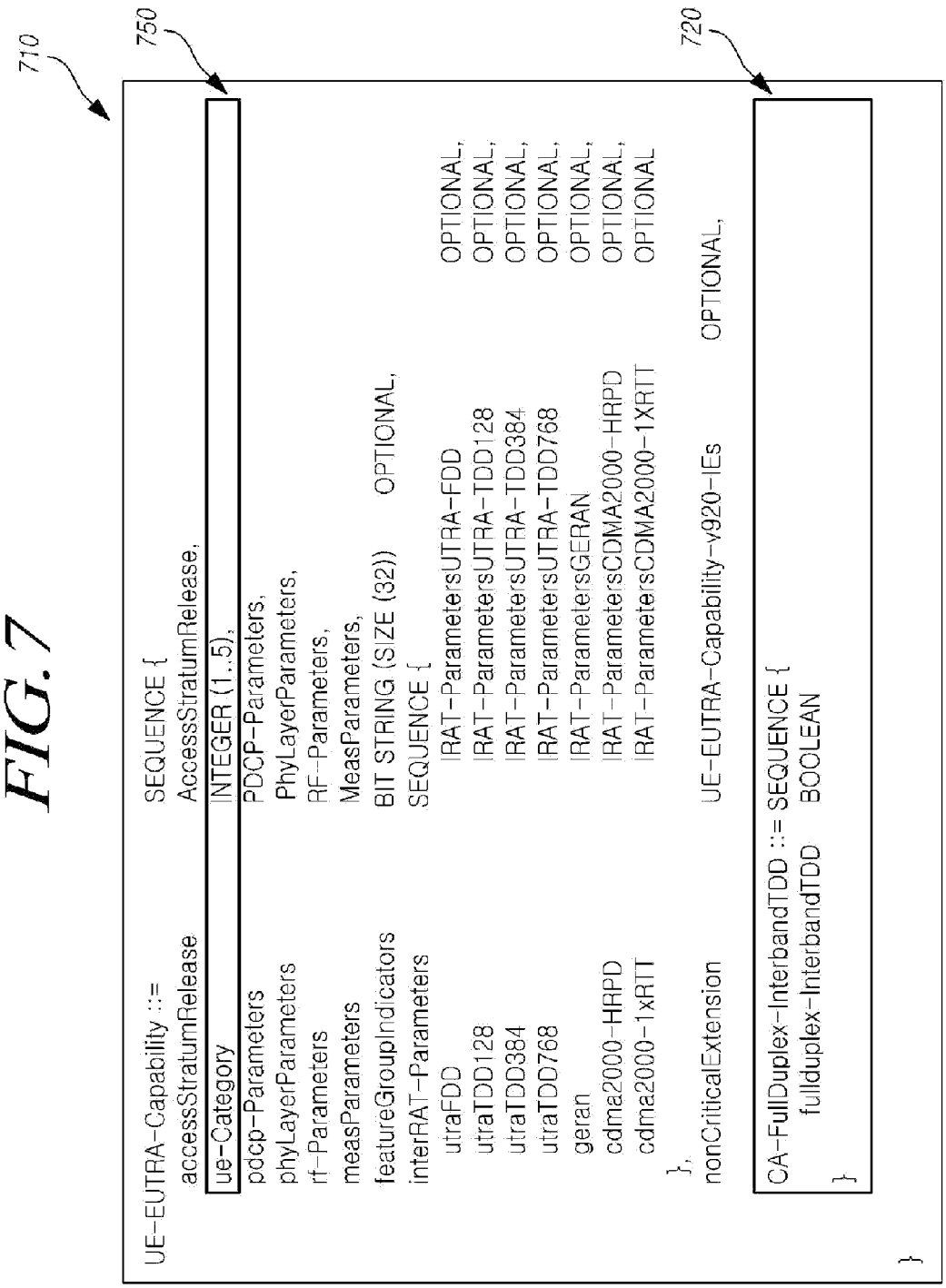
FIG. 7 is a diagram illustrating an example of embodying transmission mode information as an additional field in a UE Capability Information IE, according to an embodiment of the present invention.

FIG. 7 is a diagram illustrating an example of embodying transmission mode information as an additional field in a UECapabilityInformation IE, according to an embodiment of the present invention.

The diagram 710 shows a configuration of the UECapabilityInformation IE. The fields forming the UECapabilityInformation IE includes accessStratumRelease, ue-Category, pdcp-Parameters, and the like, and may further includes a field named "CA-FullDuplex-InterbandTDD" according to an embodiment of the present invention, as shown in the diagram 720. This will be illustrated in detail as follows.

```
UE-EUTRA-Capability ::=    SEQUENCE {
   accessStratumRelease       AccessStratumRelease,
      ......
   CA-FullDuplex-InterbandTDD::= SEQUENCE {
      fullduplex-InterbandTDD    BOOLEAN    }
}
```

CA-FullDuplex-InterbandTDD includes a fullduplex-InterbandTDD field having a Boolean value. When a message including a user equipment capability information structure in which a value of the fullduplex-InterbandTDD field is set to be true is transmitted, it indicates that a corresponding user equipment may execute transmission based on the full-duplex mode in the inter-band CA environment. Conversely, when a message including a user equipment capability information structure in which a value of the fullduplex-InterbandTDD field is set to be false is transmitted, it indicates that a corresponding user equipment may execute transmission based on the half-duplex mode in the inter-band CA environment.

As a matter of course, unlike the diagram 720, this may only be set through a field of the Boolean value. For example, the field named CA-FullDuplex-InterbandTDD may be configured using the Boolean value, as opposed to being composed as a sequence, as shown below.

```
UE-EUTRA-Capability ::=    SEQUENCE {
   accessStratumRelease       AccessStratumRelease,
      ......
   CA-Fullduplex-InterbandTDD    BOOLEAN
}
```

As described above, a user equipment may include a separate field in an UECapabilityInformation IE which is the user equipment capability information structure, so as to provide information associated with a transmission mode to a network/base station. The CA-FullDuplex-InterbandTDD may be configured to be selectively added and transmitted by only a predetermined user equipment. For example, a UE that supports only the half-duplex transmission mode, or desires to operate based on the half-duplex transmission mode though it supports the full-duplex transmission mode, in a conflicting subframe in the TDD inter-band CA environment may add the CA-FullDuplex-InterbandTDD field in the UECapabilityInformation, may configure the information of the field to indicate the half-duplex transmission mode, and may report the same to an eNB.

The CA-FullDuplex-InterbandTDD information may be signaling information available to only the UEs that support the inter-band CA including different TDD-UL/DL configurations in the TDD system. That is, the UEs that do not support the inter-band CA may not need to configure CA-FullDuplex-InterbandTDD information.

Whether the corresponding UE supports the half-duplex transmission mode or the full-duplex transmission mode in a conflicting subframe in the TDD-inter band CA environment is reported to an eNB by adding the CA-FullDuplex-InterbandTDD field to the UECapabilityInformation IE, so that different TDD configurations may be available in the inter-band CA of the corresponding UE.

FIG. 8 is a diagram illustrating a set value for adjusting a UE-Category value in a UECapabilityInformation IE and setting a transmission mode, according to another embodiment of the present invention.

In (a) of FIG. 8, a transmission mode may be set based on a value of UE-Category of the diagram 750 of FIG. 7. For example, UE-Category may be set to an integer value, and the category indicated by the integer value may be 1 through 8 and may indicate supportable downlink and uplink capability (or performance) of a user equipment.

As shown in (a) of FIG. 8, numbers of the category may be classified based on a full-duplex transmission mode and a half-duplex transmission mode. That is, the categories 1 through 8 (category 1~8) set categories of a UE of the full-duplex mode, and the categories 9 through 16 (category 9~16) set categories of a UE of the half-duplex mode. Accordingly, information associated with a transmission mode of a UE may be provided without adding a separate field in the UECapabilityInformation IE. Also, a value of "UE-Category-v1020" which is a category set field in "UE-EUTRA-Capability-v1020-IEs" in FIG. 9 may be set based on the scheme of (a) of FIG. 8. In (a) of FIG. 8, a category set to be the full-duplex mode may be determined variously. For example, unlike (a) of FIG. 8, the categories 1~8 are set to support the half-duplex mode in the inter-band CA, and the categories 9~16 are set to support the full-duplex mode in the inter-band CA.

In (b) of FIG. 8, information associated with whether the full-duplex is supported may be set through a single field (Support For Full-Duplex For interband CA).

That is, in (b) of FIG. 8, a user equipment may select, from among the categories 1~16, category information and transmit the same to a base station/network, by taking into consideration various capabilities of the user equipment and a capability of supporting a full-duplex transmission in the inter-band CA, using a "Support For Full-Duplex For interband CA" field indicating information associated with whether the full-duplex transmission is supported in the inter-band CA environment.

The schemes of FIGS. 7 and 8 include transmission mode information of a UE in a field configuring UECapabilityInformation, which is a user equipment capability information structure. Subsequently, other embodiments of the present invention to be described below correspond to transmission of information associated with a capability, for example a full-duplex/half-duplex transmission mode in a conflicting subframe, of a corresponding UE based on a supportable band combination.

Hereinafter, in FIGS. 9 through 12, CA information associated with a DL or a UL may be independently applied to UE capability information. Unlike the above, the full-duplex/half-duplex transmission mode may be set independently for each subframe. To this end, hereinafter, a scheme of setting a different value based on a band and a downlink/uplink will be described in FIGS. 9 through 12.

Transmission mode information of a UE may be included in separately configured UE-EUTRA-Capability-v1100-IEs. For example, UE-EUTRA-Capability-v1100-IEs may be defined as below and may be configured to include an RF-Parameters-v1100 field.

The UE-EUTRA-Capability-v11xx-IE shown below includes UE-EUTRA-Capability-v1100-IEs, and the configuration is as shown below. (xx indicates that it includes all variable versions in Rel.11 or is applicable to the versions.)

```
UE-EUTRA-Capability ::=        SEQUENCE {
    ...
    nonCriticalExtension    UE-EUTRA-Capability-v920-IEs       OPTIONAL
}
UE-EUTRA-Capability-v920-IEs ::=       SEQUENCE {
    ...
    nonCriticalExtension    UE-EUTRA-Capability-v940-IEs       OPTIONAL
}
UE-EUTRA-Capability-v940-IEs ::= SEQUENCE {
    ...
    nonCriticalExtension    UE-EUTRA-Capability-v1020-IEs      OPTIONAL
}
UE-EUTRA-Capability-v1020-IEs ::=      SEQUENCE {
    ...
    nonCriticalExtension    UE-EUTRA-Capability-v11xx-IEs      OPTIONAL
}
UE-EUTRA-Capability-v11xx-IEs ::=      SEQUENCE {
    ue-Category-v11xx              INTEGER (6..8)              OPTIONAL,
    phyLayerPararmeters-v11xx      PhyLayerParameters-v11xx    OPTIONAL,
    rf-Parameters-v11xx            RF-Parameters-v11xx         OPTIONAL,
    measPararneters-v11xx          MeasParameters-v11xx        OPTIONAL,
    featureGroupIndicators-v11xx   BIT STRING (SIZE (32))      OPTIONAL,
    interRAT-ParametersCDMA2000-v11xx      IRAT-ParametersCDMA2000-1XRTT-v11xx     OPTIONAL,
    ue-BasedNetwPerfMeasParameters-r11     UE-BasedNetwPerfMeasParameters-r11      OPTIONAL,
    interRAT-ParametersUTRA-TDD-v11xx      IRAT-ParametersUTRA-TDD-v11xx           OPTIONAL,
    nonCriticalExtension           SEQUENCE { }                OPTIONAL
}
``` rfParameters-v11xx is included in the UE-EUTRA-Capability-v11xx-IEs. That is, it may be configured as follows. When v11xx is set to v1100, the configuration may be as follows.

```
UE-EUTRA-Capability-v1100-IEs ::=      SEQUENCE {
    ue-Category-v1100              INTEGER (6..8)              OPTIONAL,
    phyLayerParameters-v1100       PhyLayerParameters-v1100    OPTIONAL,
    rf-Parameters-v1100            RF-Parameters-v1100         OPTIONAL,
    measParameters-v1100           MeasParameters-v1100        OPTIONAL,
    featureGroupIndicators-v1100   BIT STRING (SIZE (32))      OPTIONAL,
```

-continued

| | | |
|---|---|---|
| interRAT-ParametersCDMA2000-v1100 | IRAT-ParametersCDMA2000-1XRTT-v1100 | OPTIONAL, |
| ue-BasedNetwPerfMeasParameters-r11 | UE-BasedNetwPerfMeasParameters-r11 | OPTIONAL, |
| interRAT-ParametersUTRA-TDD-v1100 | IRAT-ParametersUTRA-TDD-v1100 | OPTIONAL, |
| nonCriticalExtension    SEQUENCE { } | OPTIONAL | |
}

Figure 9:
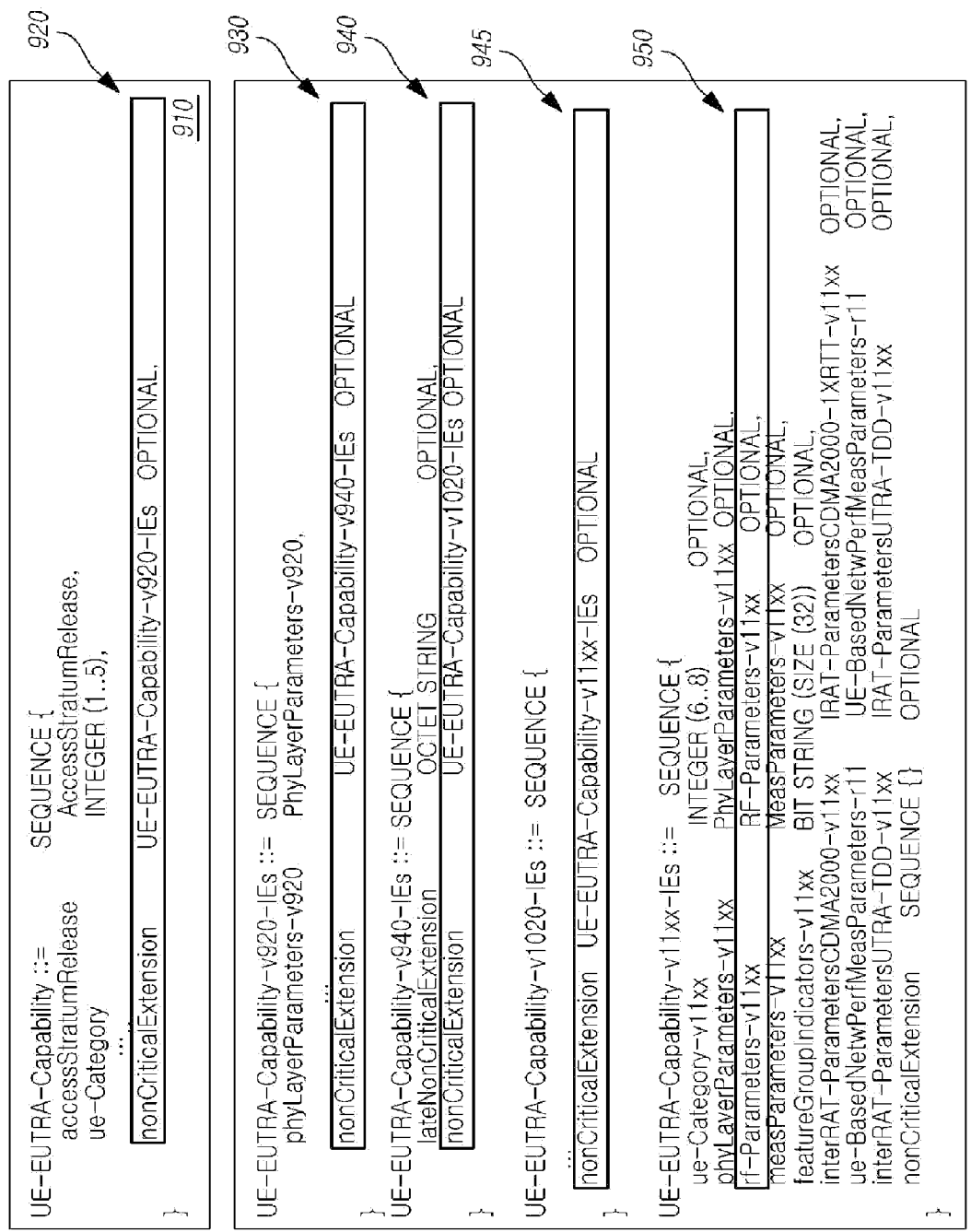
FIG. 9 is a diagram illustrating an example of including supportable transmission mode information of a UE in a band combination supported by the UE according to another embodiment of the present invention.

FIG. 9 is a diagram illustrating an example of including supportable transmission mode information of a UE in a band combination that is supported by the UE, according to another embodiment of the present invention. The diagram 910 of FIG. 9 is UECapabilityInformation 710 as described in FIG. 7. In the information, "UE-EUTRA-Capability-v11 xx-IEs" is extended information of "nonCriticalExtension" 920. "nonCriticalExtension" 920 may be indicated by a "nonCriticalExtension" 930 of "UE-EUTRA-Capability-v920-IEs", "nonCriticalExtension" 940 of "UE-EUTRA-Capability-v940-IEs", and "nonCriticalExtension" 945 of "UE-EUTRA-Capability-v1020-IEs".

A transmission mode that a UE is capable of supporting, or desires to support, may be determined using "rf-Parameters-v11xx" 950 from among fields forming "UE-EUTRA-Capability-v11 xx-IEs". That is, a type that forms the rf-Parameters-v11xx" field 950 is "RF-Parameters-v11xx" and thus, the present specifications include supportable transmission mode information of a UE in a band combination supported by the UE in a field that forms "RF-Parameters-v11 xx". Detailed descriptions thereof will be provided with reference to FIG. 10.

FIG. 10 is an embodiment of including supportable transmission mode information of a UE in RF-Parameters-v11xx of FIG. 9.

"RF-Parameters-v11xx" is formed of a field named "RF-Parameters-v11xx", and a type of the field is "SupportedBandCombination-r11". The type is formed of "BandCombinationParameters-r11", which is formed of "BandParameters-r11".

A configuration of "BandParameters-r11" 1010 includes a "bandEUTRA-r11" field corresponding to information associated with a band, and "bandParametersUL-r11" corresponding to a parameter of an uplink band and "bandParametersDL-r11" corresponding to a parameter of a downlink band, which include "CA-MIMO-ParametersUL-r11" and "CA-MIMO-ParametersDL-r11" information, respectively, as shown in the diagrams 1020 and 1030.

To apply an embodiment of the present invention, "ca-SimultaneousTxRx-CapabilityUL-r11" and "ca-SimultaneousTxRx-CapabilityDL-r11", which are fields of a "CA-SimultaneousTxRx-r11" type, are included in "CA-MIMO-ParametersUL-r11" and "CA-MIMO-ParametersDL-r11", and they may be embodied to have one of the values from among {Half Duplex, Full Duplex}.

As shown in FIGS. 9 and 10, information associated with a transmission mode (half duplex or full duplex) is added to a capability part of a UE that is supportable, or is to be operated in a corresponding band defined in a band combination supported by the corresponding UE, so that the UE capability that the corresponding UE may support in a conflicting subframe in the inter-band-CA-TDD mode may be reported. Accordingly, a transmission mode of a UE for each band/for each CC/ for each DL-UL may be set.

Therefore, whether the corresponding UE supports a half-duplex transmission mode or a full-duplex transmission mode in each direction may be signaled based on a capability of a CA (Carrier aggregation) on a DL and a UL of the UE.

That is, information associated with a transmission mode (half duplex or full duplex) may be additionally added to a CA capability (carrier aggregation capability) field that the corresponding UE supports in the corresponding band, so that the UE capability may be reported.

Figure 11:
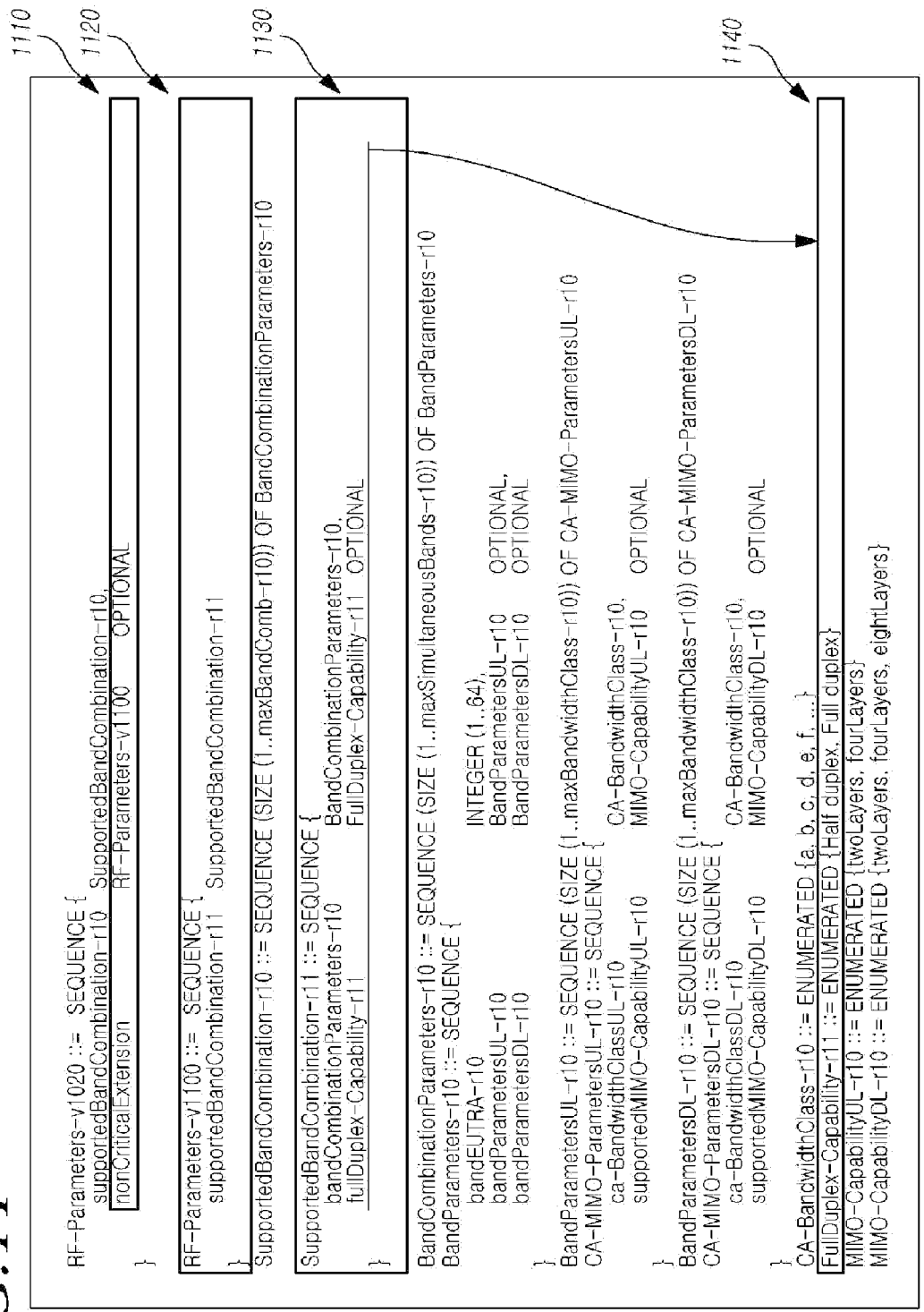
FIG. 11 is a diagram illustrating an example of including supportable transmission mode information of a UE in a band combination supported by the UE according to another embodiment of the present invention.

FIG. 11 is a diagram illustrating an example of including supportable transmission mode information of a UE in a band combination that is supported by the UE, according to another embodiment of the present invention. Unlike FIGS. 9 and 10, band combination information (SupportedBandCombination-r11) is separately included.

As shown in the diagram 1110, a "nonCriticalExtension" field is included in "RF-Parameters-v1020" so as to indicate information associated with an "RF-Parameters-v1100" field. Also, the "RF-Parameters-v1100" field includes a "supportedBandCombination-r11" field as shown in the diagram 1120, and a configuration field of the "SupportedBandCombination-r11" field includes a "bandCombination-Parameters-r10" field and a "fullDuplex-Capability-r11" field as shown in the diagram 1130.

The "fullDuplex-Capability-r11" field may be configured to include one of the values from among {Half Duplex, Full Duplex}, as shown in the diagram 1140.

Whether a corresponding UE supports a half-duplex transmission mode, supports a full-duplex transmission mode, or desires to use a predetermined transmission mode based on a band combination supported by the corresponding UE, may be indicated using a "fullDuplex-Capability-r11" value of FIG. 11.

That is, information associated with a transmission mode (half duplex or full duplex) is included in newly defined new band combination information and is transmitted to an eNB, so that the UE capability of the corresponding UE may be reported. The RF-Parameters-v1100 field of FIG. 11 may be embodied to be included in new UE-EUTRA-Capability-v1110-IEs.

Figure 12:
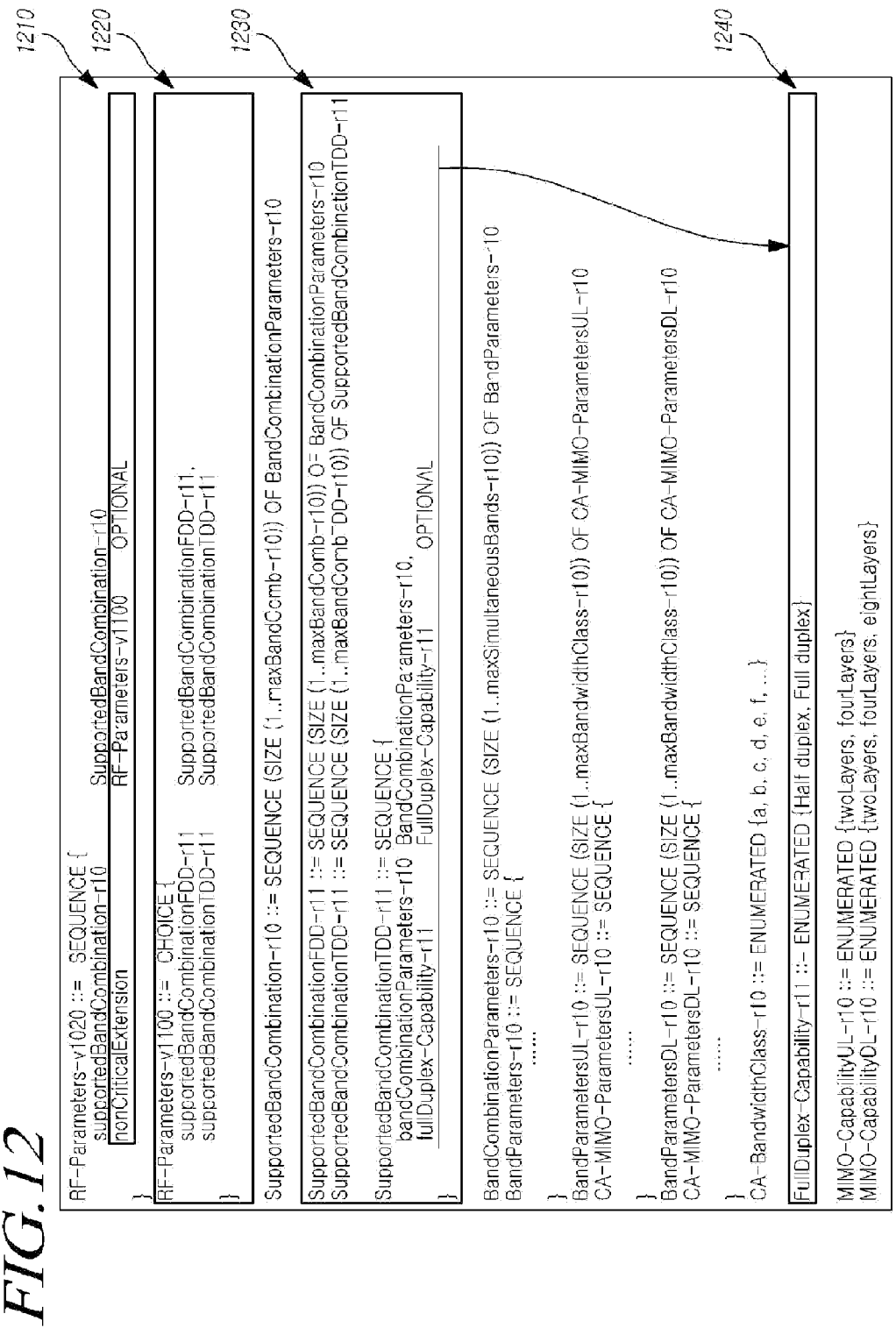
FIG. 12 is a diagram illustrating a process of setting a transmission mode by separately designating a band combination that is newly supported for a TDD system, according to another embodiment of the present invention.

FIG. 12 is a diagram illustrating an example of setting a transmission mode by separately designating a band combination that is newly supported for a TDD system according to another embodiment of the present invention. Unlike FIGS. 9, 10, and 11, a band combination newly supported for a TDD system is separately designated, and information associated with the transmission mode (half duplex or full duplex) is included in a band combination field supported for the corresponding TDD, for reporting.

As shown in the diagram 1210, a "nonCriticalExtension" field is included in "RF-Parameters-v1020" so as to indicate information associated with an "RF-Parameters-v1100" field. Also, the "RF-Parameters-v1100" field includes a "supportedBandCombinationFDD-r11" field or a "supportedBandCombinationTDD-r11" field as shown in the diagram 1220, and the fields may be defined to be a type as shown in the diagram 1230.

"SupportedBandCombinationTDD-r11" which is a type applied in the case of TDD includes "fullDuplex-Capabilityr11" as shown in the diagram 1230, and may be configured to include one of the values from among {Half Duplex, Full Duplex} as shown in the diagram 1240.

Whether a corresponding UE supports a half-duplex transmission mode, supports a full-duplex transmission mode, or desires to use a predetermined transmission mode based on a band combination supported by the corresponding UE, may be indicated using a "fullDuplex-Capability-r11" value of FIG. 12.

That is, information associated with a transmission mode (half duplex or full duplex) is included in newly defined new band combination information and is transmitted to an eNB, so that the UE capability of the corresponding UE may be reported. The RF-Parameters-v1100 field of FIG. 12 may be embodied to be included in new UE-EUTRA-Capability-v1110-IEs.

Figure 13:
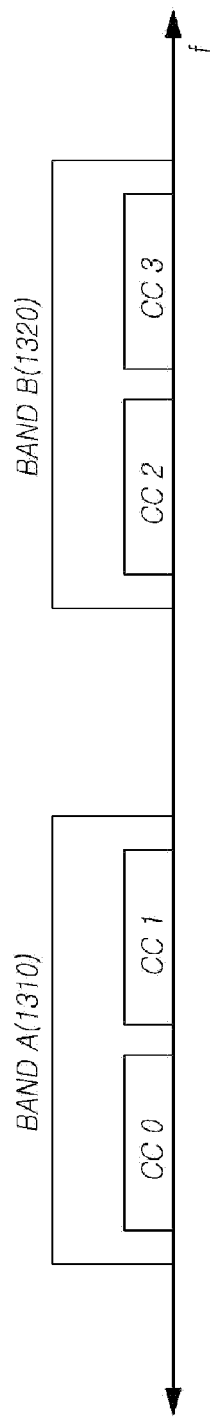
FIG. 13 is a diagram illustrating an inter-band CA environment according to an embodiment of the present invention.

FIG. 13 is a diagram illustrating an inter-band CA environment according to an embodiment of the present invention. In FIG. 13, a TDD configuration (TDD uplink-downlink configuration) of a band A 1310 is #0, and a TDD configuration of a band B 1320 is #1. Accordingly, a TDD configuration of a CC0 and a CC1, which are individual CCs, and a TDD configuration of a CC2 and a CC3 are different from each other. As an example in which CCs having different inter-band CA/TDD configurations are used, the case in which CC0-CC2, CC1-CC3, CC1-CC2, or CC0-CC3 is used may be assumed. A procedure that reports the information associated with a UE capability of FIGS. 5 and 6 in operations S550 and S640 may be provided to an eNB or an EUTRAN based on the schemes of FIGS. 7 through 12.

Figure 14:
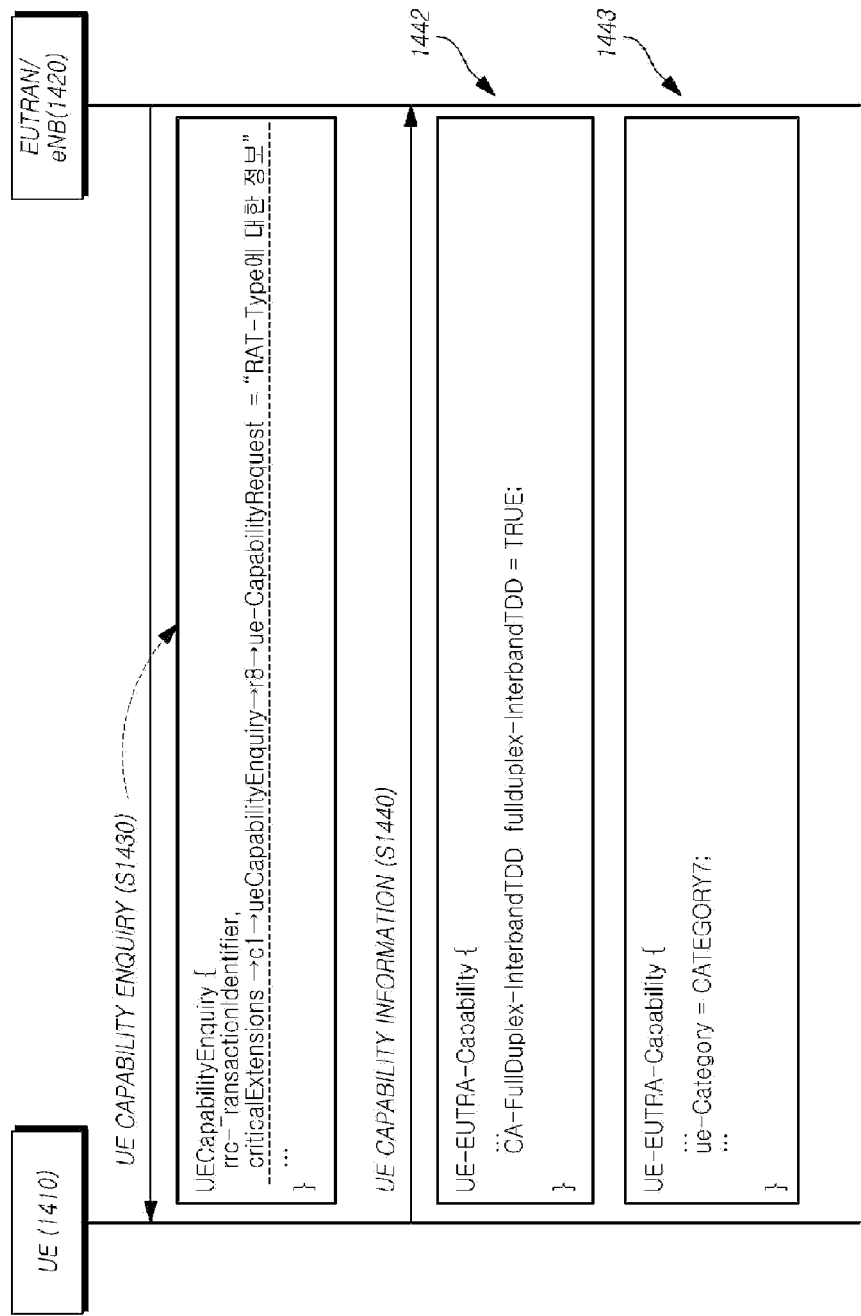
FIG. 14 is a diagram illustrating an example of transmitting information associated with whether a transmission mode, among the capabilities of a UE, is a full-duplex mode or a half-duplex mode in an inter-band CA environment based on the scheme of FIG. 7, according to an embodiment of the present invention.

FIG. 14 is a diagram illustrating an example of transmitting information associated with whether a transmission mode, among capabilities of a UE, is a full-duplex mode or a half-duplex mode in an inter-band CA environment based on the scheme of FIG. 7, according to an embodiment of the present invention. In FIG. 14, a UE 1410 receives a UECapabilityEnquiry message, and transmits a UE Capability Information message in response to the message. In the process, the UE executes transmission and reception of a message with a EUTRAN or an eNB 1420.

A structure of the UECapabilityEnquiry message of FIG. 14 is as shown below.

In operation S1430 of FIG. 14, the UE 1410 receives the UECapabilityEnquiry message from the EUTRAN 1420. In this instance, information associated with an RAT-type in "ue-CapabilityRequest" among fields included in the message may be received. The UE 1410 transmits a UE Capability Information message in response to the reception, and the message may include the message structure of FIG. 7, so as to transmit information associated with a transmission mode in the inter-band CA environment (the case in which TDD configurations are different). This may be configured as shown in the diagrams 1442 and 1443. The diagram 1442 includes a separate field as shown in the diagram 720 of FIG. 7, and indicates that the UE 1410 operates in the full-duplex transmission mode in the inter-band CA environment (the case in which TDD configurations are different). That is, a fullduplex-InterbandTDD value of a CA-FullDuplex-InterbandTDD field in the UE-EUTRA-Capability message is set to be TRUE and may be reported to a network or a base station. As a matter of course, unlike the diagram 1442, a value may be directly included in the UE-EUTRA-Capability message, instead of a scheme of including a parameter in a field. For example, this may be configured as below.

```
UE-EUTRA-Capability{
    ...
    fullduplex-InterbandTDD = TRUE;
}
```

The information associated with a transmission mode may be transmitted through a value of ue-Category as shown in the diagram 750 of FIG. 7, and the corresponding embodiment may correspond to the diagram 1443. Referring to the table of FIG. 8, a corresponding category value (CAEGORY 7) is selected from the full-duplex transmission mode (Full-Duplex), and is transmitted. In the case of the half-duplex, a corresponding category value (CATEGORY 15) may be set and transmitted.

Figure 15:
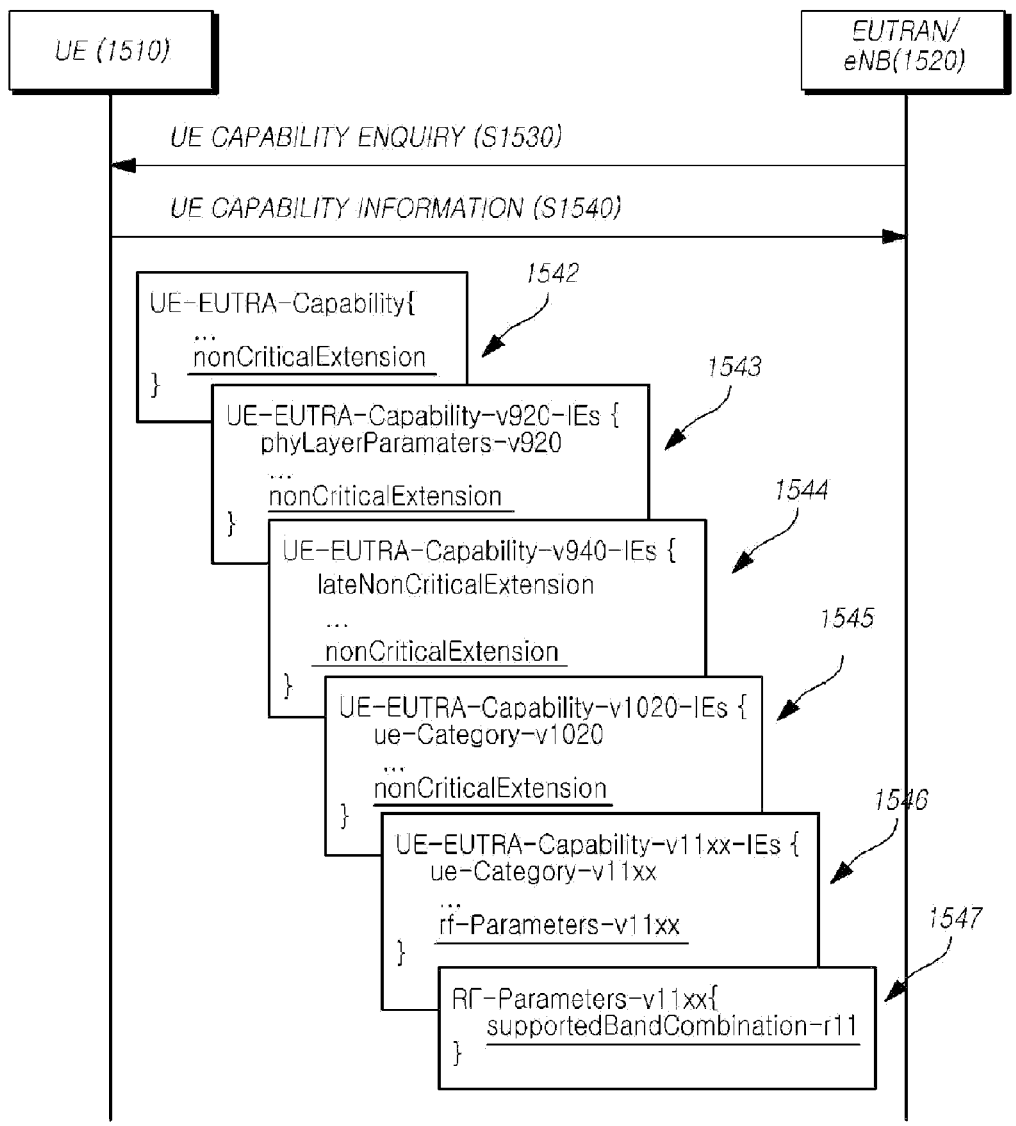
FIG. 15 is a diagram illustrating an example of transmitting information associated with whether a transmission mode, among the capabilities of a UE, is a full-duplex mode or a half-duplex mode in an inter-band CA environment based on the schemes of FIGS. 9 and 10, according to another embodiment of the present invention.

FIG. 15 is a diagram illustrating an example of transmitting information associated with whether a transmission mode, among capabilities of a UE, is a full-duplex mode or a half-duplex mode in an inter-band CA environment based on the schemes of FIGS. 9 and 10, according to another embodiment of the present invention. Operation S1530 may be embodied in the same manner or in the similar manner to operation S1430 of FIG. 14.

In operation S1540 of FIG. 15, information associated with the full-duplex/half-duplex transmission mode is provided through a UE-EUTRA-Capability message 1542, as illustrated in FIGS. 9 and 10. A part indicated by the fields 920, 930, 940, and 950 of FIG. 9 may be illustrated in the diagrams 1543, 1544, and 1545 of FIG. 15. The diagram 1543 is a configuration of UE-EUTRA-Capability-v920-IEs

```
UECapabilityEnquiry ::=        SEQUENCE {
    rrc-TransactionIdentifier      RRC-TransactionIdentifier,
    criticalExtensions             CHOICE {
        c1                         CHOICE {
            ueCapabilityEnquiry-r8             UECapabilityEnquiry-r8-IEs,
            spare3 NULL, spare2 NULL, spare1 NULL
        },
        criticalExtensionsFuture              SEQUENCE { }
    }
}
UECapabilityEnquiry-r8-IEs ::=  SEQUENCE {
    ue-CapabilityRequest           UE-CapabilityRequest,
    nonCriticalExtension           UECapabilityEnqWry-v8a0-IEs
}
UECapabilityEnquiry-v8a0-IEs :: =SEQUENCE {
    lateNonCriticalExtension       OCTET STRING       OPTIONAL,   -- Need OP
    nonCriticalExtension           SEQUENCE { }       OPTIONAL    -- Need OP
}
UE-CapabilityRequest ::=    SEQUENCE (SIZE (1..maxRAT-Capabilities)) OF RAT-Type
``` indicated by the diagram 920 (nonCriticalExtension) of FIG. 9. The diagram 1544 is a configuration of UE-EUTRA-Capability-v940-IEs indicated by the diagram 930 (nonCriticalExtension) of FIG. 9. The diagram 1545 is a configuration of UE-EUTRA-Capability-v1020-IEs indicated by the diagram 940 (nonCriticalExtension) of FIG. 9. The diagram 1547 is a configuration of RF-Parameters-v11 xx of FIG. 10 indicated by the diagram 950 (rf-Parameters-v11xx) of FIG. 9. Here, in RF-Parameters-v11 xx, information associated with supported bands may be included in a "supportedBandCombination-r11" field. This may be embodied as an embodiment of the present specifications provided through the diagrams 1010, 1020, 1030, and 1040 of FIG. 10.

Accordingly, band information associated with two bands of FIG. 13 may be included in the diagram 1547. This will be described in detail with reference to FIG. 16.

Figure 16:
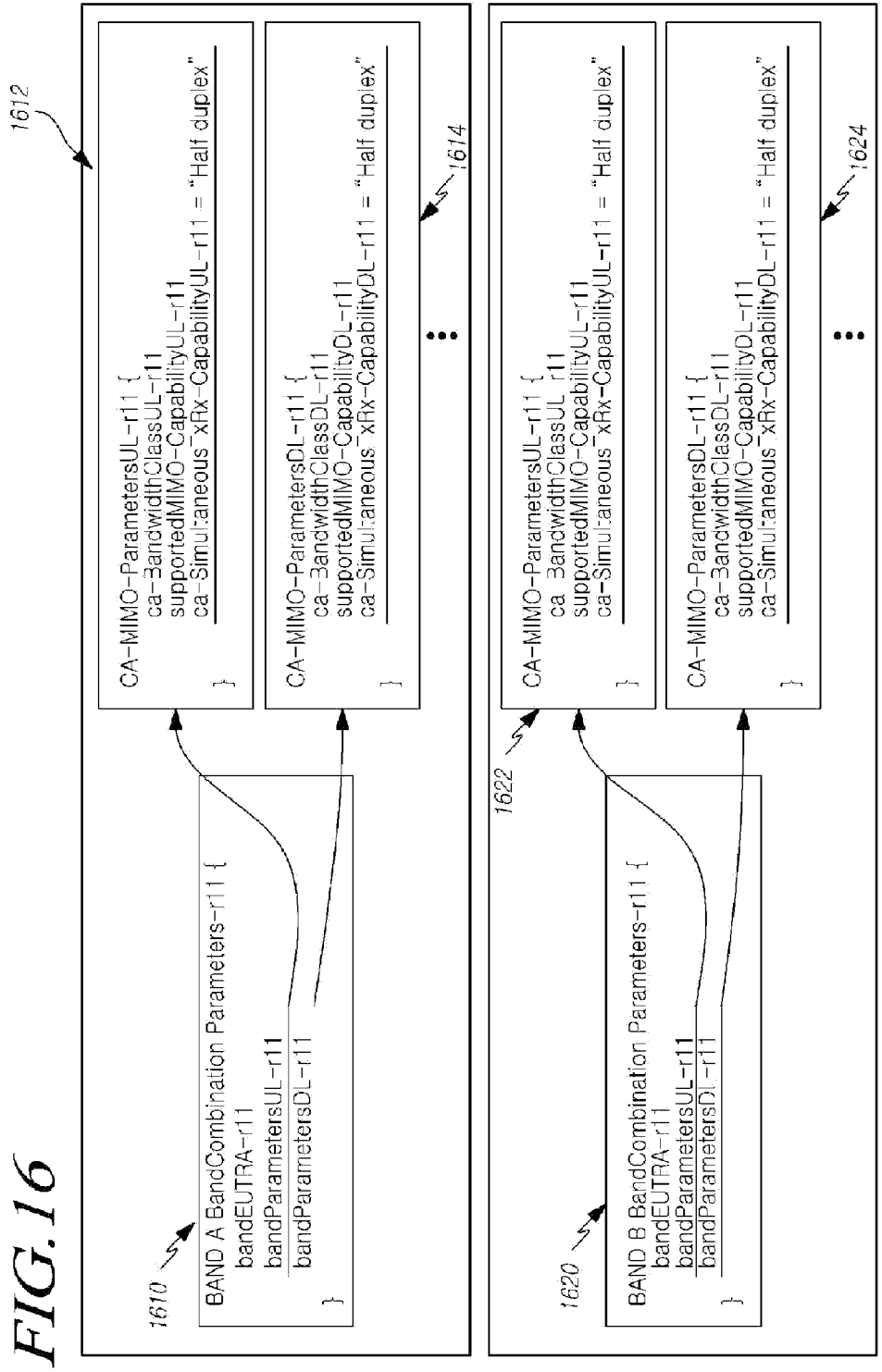
FIG. 16, after

FIG. 16, after FIG. 15, is a diagram illustrating an example of transmitting information associated with whether a transmission mode, among capabilities of a UE, is a full-duplex mode or a half-duplex mode in an inter-band CA environment using band information in a "supportedBandCombination-r11" field.

FIG. 16 illustrates an example of including band information associated with two bands (Band A and Band B) of FIG. 13, particularly, band information 1610 associated with the Band A and band information 1620 associated with the Band B, in the "supportedBandCombination-r11" field of the diagram 1546 of FIG. 15. The information associated with each band uses bandParametersUL-r11 and bandParametersDL-r11 fields 1612, 1614, 1622, and 1624, in association with an uplink/downlink as shown in the diagrams 1610 and 1620. Information associated with a full-duplex/half-duplex transmission mode provided in the present specifications may be included in a ca-SimultaneousTxRx-CapabilityUL-r11 field and a ca-SimultaneousTxRx-CapabilityDL-r11 field, respectively, among the fields. In FIG. 16, a half-duplex transmission mode is set for the Band A and the Band B. However, a DL and a UL may be independently set when they are embodied. For example, a UL of the Band A and the Band B of FIG. 16 may be set to be half-duplex mode, and a DL of the band A and the band B may be set to be full-duplex mode.

Figure 17:
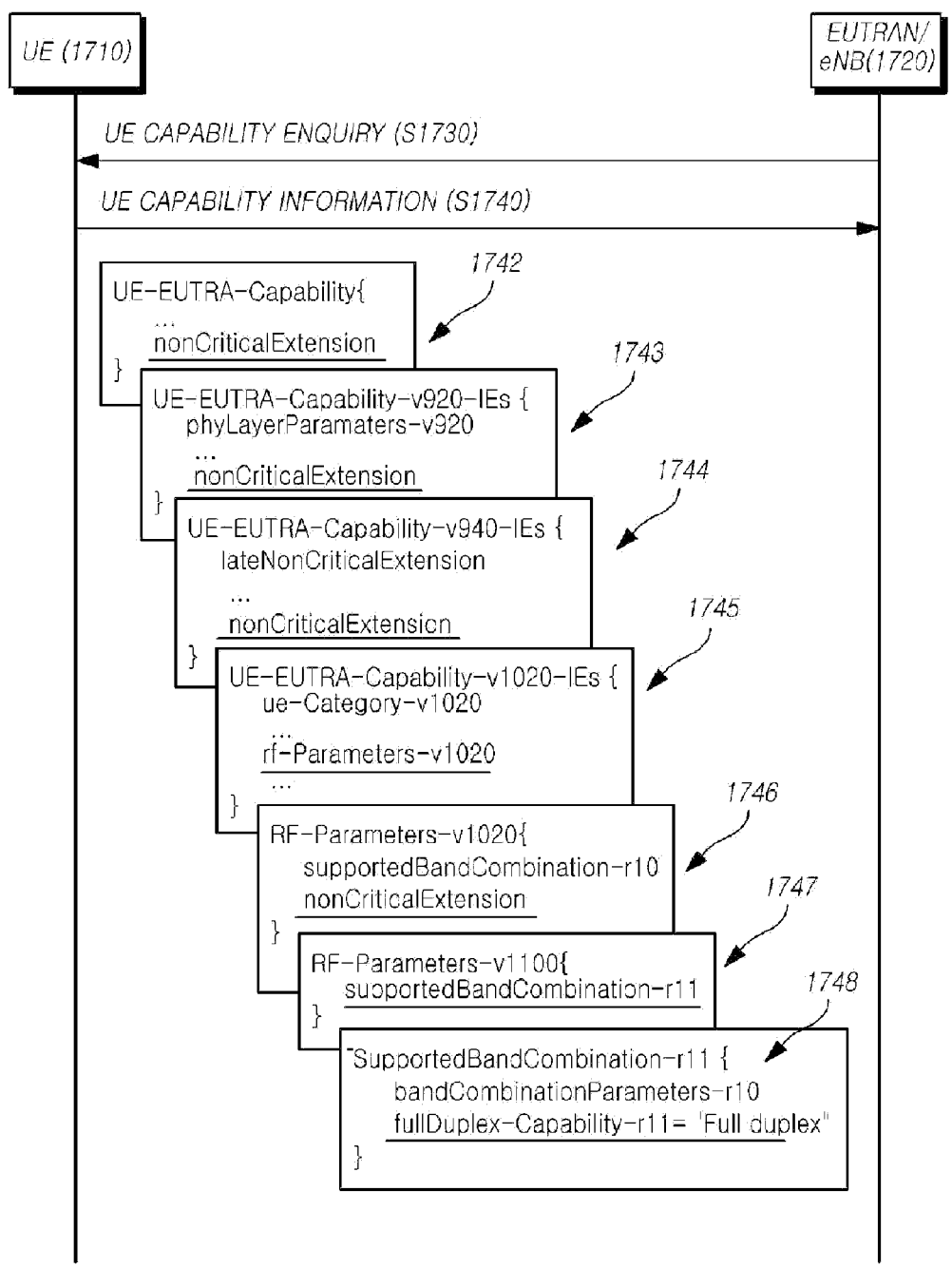
FIG. 17 is a diagram illustrating an example of transmitting information associated with whether a transmission mode, among the capabilities of a UE, is a full-duplex mode or a half-duplex mode in an inter-band CA environment based on the scheme of FIG. 11, according to another embodiment of the present invention.

FIG. 17 is a diagram illustrating an example of transmitting information associated with whether a transmission mode, among capabilities of the UE, is a full-duplex mode or a half-duplex mode in an inter-band CA environment based on the scheme of FIG. 11, according to another embodiment of the present invention. Operation S1730 may be embodied in the same manner or in the similar manner to operation S1430 of FIG. 14 and operation S1530 of FIG. 15.

In operation S1740, information associated with the full-duplex/half-duplex transmission mode is provided through a UE-EUTRA-Capability message 1742, as illustrated in FIG. 11. The parts indicated by the fields 920, 930, 940, and 950 of FIG. 9 are illustrated in the diagrams 1743, 1744, and 1745 of FIG. 17, and they correspond to the diagrams 1543, 1544, and 1545 of FIG. 15 and the descriptions thereof may be substituted by the descriptions of FIG. 15.

As described in FIG. 11, a new field "nonCriticalExtension" is added to a configuration of rf-Parameters-v1020 of the diagram 1745, as shown in the diagram 1746. The type of the field is designated to be "RF-Parameters-v1100", as shown in the diagram 1747, and is indicated by "supportedBandCombination-r11" which is a field that forms the above. The value is set to be fullDuplex-Capability-r11="Full duplex", as shown in the diagram 1748, so that an EUTRAN/eNB 1720 may be informed that a transmission mode is a full-duplex transmission mode.

Figure 18:
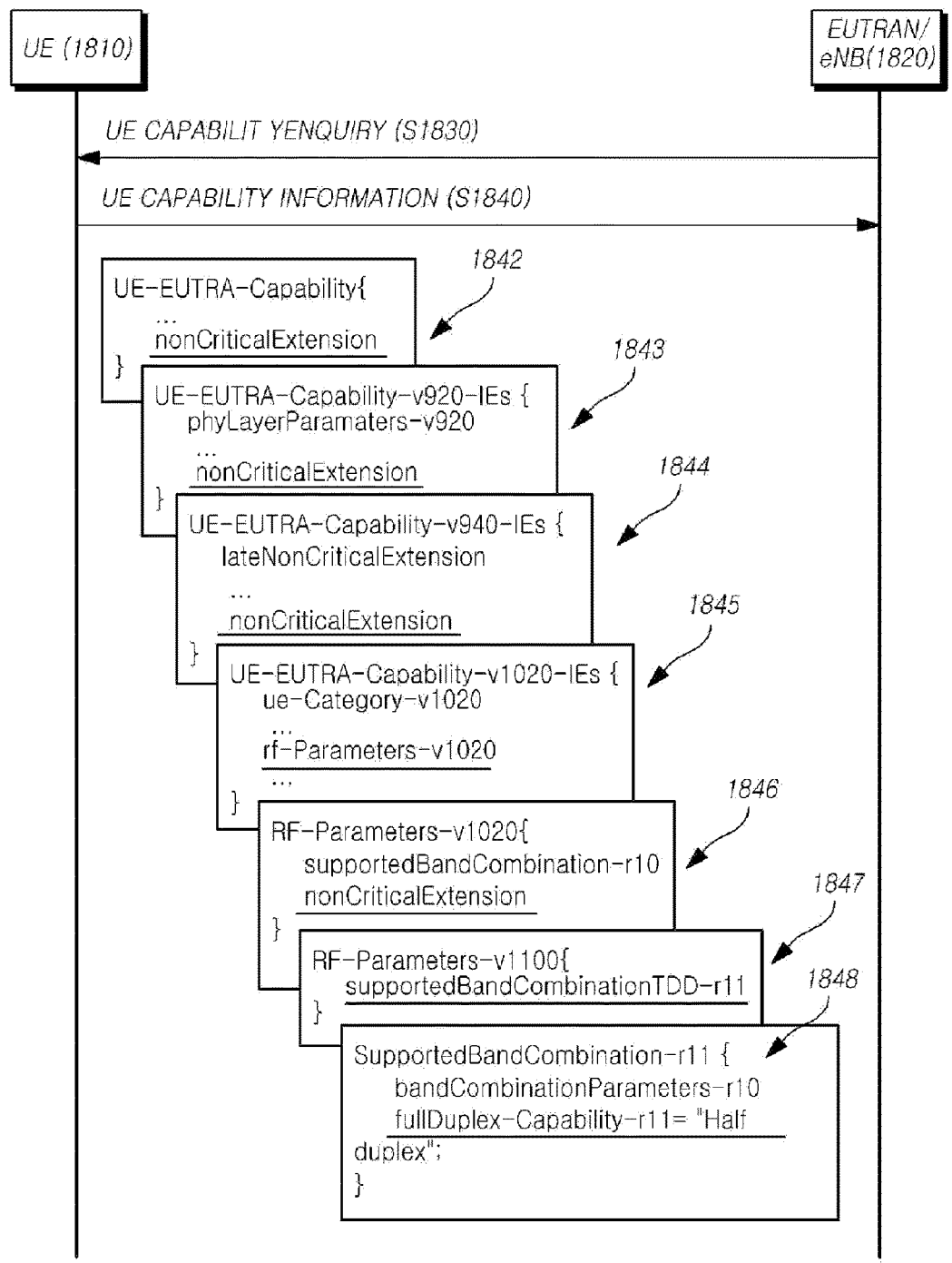
FIG. 18 is a diagram illustrating an example of transmitting information associated with whether a transmission mode, among the capabilities of a UE, is a full-duplex mode or a half-duplex mode in an inter-band CA environment based on the scheme of FIG. 12, according to another embodiment of the present invention.

FIG. 18 is a diagram illustrating an example of transmitting information associated with whether a transmission mode, among capabilities of a UE, is a full-duplex mode or a half-duplex mode in an inter-band CA environment based on the scheme of FIG. 12, according to another embodiment of the present invention. Operation S1830 may be embodied in the same manner or in the similar manner to operation S1430 of FIG. 14, operation S1530 of FIG. 15, and operation S1730 of FIG. 17.

In operation S1840, information associated with the full-duplex/half-duplex transmission mode is provided through a UE-EUTRA-Capability message 1842, as illustrated in FIG. 12. The parts indicated by the fields 920, 930, 940, and 950 of FIG. 9 are illustrated in the diagrams 1843, 1844, and 1845 of FIG. 18, and they correspond to the diagrams 1543, 1544, and 1545 of FIG. 15 and the descriptions thereof may be substituted by the descriptions of FIG. 15.

As described in FIG. 12, a new field "nonCriticalExtension" is added to the configuration of rf-Parameters-v1020 of the diagram 1845, as shown in the diagram 1846, a type of the field is designated to be "RF-Parameters-v1100", as shown in the diagram 1847, the "supportedBandCombinationTDD-r11" field is used as a field that forms the above when a corresponding band is TDD, and it is a SupportedBandCombinationTDD-r11 type and a value is set to be fullDuplex-Capability-r11="Half duplex", as shown in the diagram 1848, so that an EUTRAN/eNB 1820 may be informed that a transmission mode is a full-duplex transmission mode.

Figure 19:
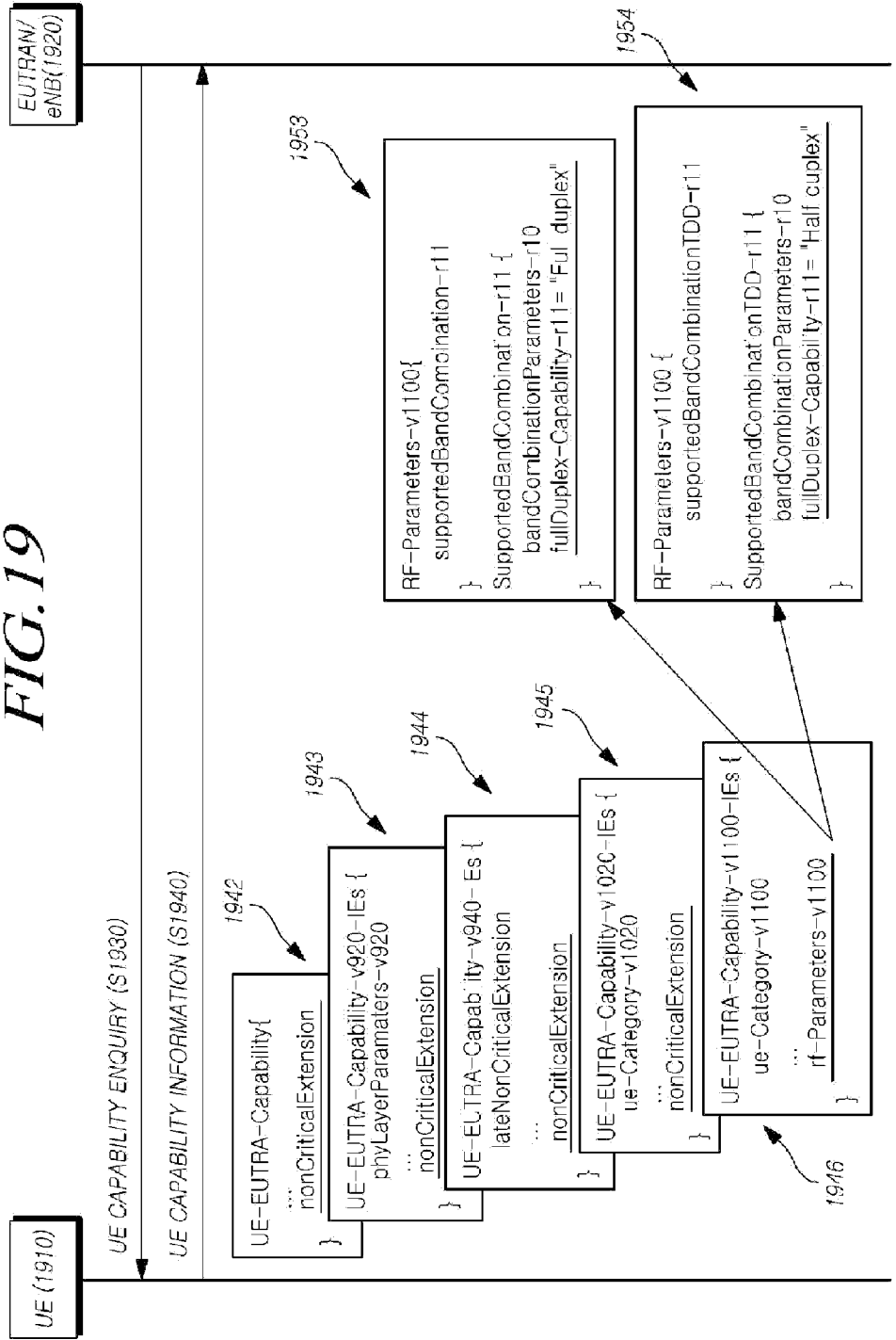
FIG. 19 is a diagram illustrating an example of transmitting information associated with whether a transmission mode, among the capabilities of a UE, is a full-duplex mode or a half-duplex mode, in an inter-band CA environment based on the schemes of FIGS. 11 and 12, according to another embodiment of the present invention.

In the case of UE-EUTRA-Capability-v1100-IEs, the configurations of FIGS. 17 and 18 are embodied as described in FIG. 19.

FIG. 19 is a diagram illustrating an example of transmitting information associated with whether a transmission mode, among capabilities of a UE, is a full-duplex mode or a half-duplex mode, in an inter-band CA environment based on the schemes of FIGS. 11 and 12, according to another embodiment of the present invention. Operation S1930 may be embodied in the same manner or in the similar manner to operation S1430 of FIG. 14 and operation S1530 of FIG. 15.

In operation S1940, information associated with the full-duplex/half-duplex transmission mode is provided through a UE-EUTRA-Capability message 1942, as illustrated in FIGS. 11 and 12. In FIG. 19, UE-EUTRA-Capability-v1100-IEs may be separately provided as shown in the diagram 1946, and an rf-Parameters-v1100 field among the elements of the UE-EUTRA-Capability-v1100-IEs may indicate a full-duplex transmission mode or a half-duplex transmission mode, as shown in the diagrams 1953 and 1954. The diagram 1953 shows an embodiment of FIG. 17, and the diagram 1954 shows an embodiment of FIG. 18.

Figure 20:
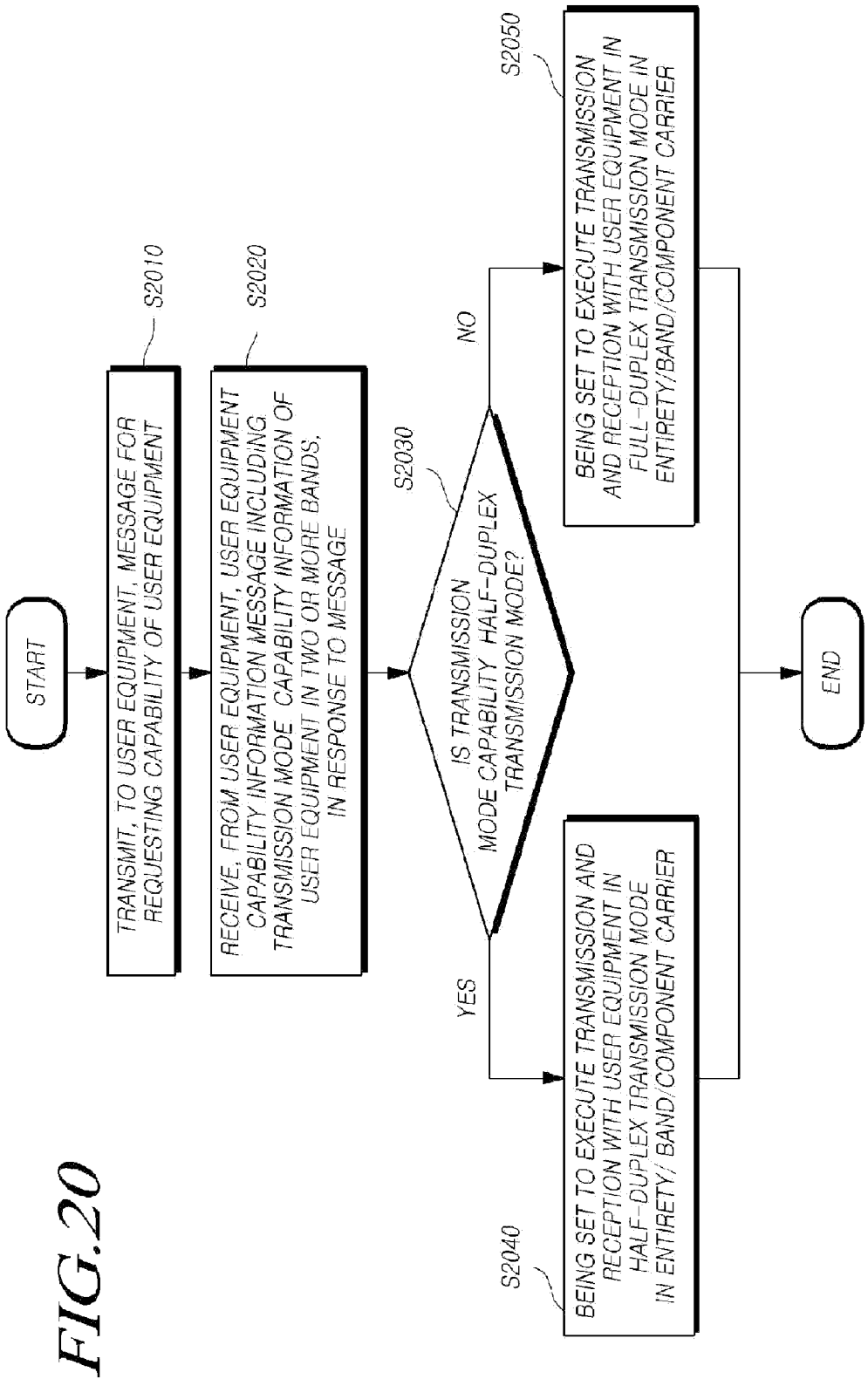
FIG. 20 is a diagram illustrating a process of receiving transmission mode information of a user equipment based on an inter-band TDD transmission mode according to an embodiment of the present invention.

FIG. 20 is a diagram illustrating a process of receiving the transmission mode information of a user equipment based on an inter-band TDD transmission scheme according to an embodiment of the present invention.

FIG. 20 may be executed in a base station that controls two or more bands set in different TDD (Time Division Duplex) configurations, or an apparatus that is coupled to the base station. First, a base station transmits, to a user equipment, a message for requesting the capability of the user equipment, in operation S2010. UECapabilityEnquiry, which has been described above, may be used as a configuration of the transmitted message. In response to the message, a user equipment capability information message including transmission mode capability information of the user equipment in the two or more bands is received in operation S2020.

The transmission mode capability information includes information associated with whether the user equipment operates in a full-duplex mode or a half-duplex mode in the two or more bands, and the schemes including the transmission mode capability information or implementing processes based on the same have been described in FIGS. 7 through 18.

According to the scheme of FIGS. 7, 8, and 14, a field that directly indicates the full-duplex or half-duplex transmission mode or a field indicating the field may be included, as the transmission mode capability information, in UE-EUTRA-Capability information element (Information Element) that forms the user equipment capability information message. This is the scheme of reporting a transmission mode of a user equipment using a predetermined field. Also, the transmission mode capability information may be indicated by a value of ue-Category that indicates a category among the fields of the UE-EUTRA-Capability information element that forms the user equipment capability information message.

Also, according to the scheme of FIGS. 8, 10, 11, 12, 15, 16, 17, 18, and 19, the transmission mode capability information may be included in a field that sets information associated with two or more bands, in "UE-EUTRA-Capability-v1020-IEs" which is a field extended from the UE-EUTRA-Capability information element that forms the user equipment capability information message. In this example, a transmission mode supported in a corresponding band or corresponding component carrier may be controlled.

The base station determines whether the transmission mode capability is the half-duplex transmission mode in operation S2030, and sets a carrier aggregation environment of the user equipment to correspond to the transmission mode capability information of the user equipment capability information message. That is, as described in FIGS. 7, 8, and 14, when the transmission mode capability information is set for the user equipment, the base station executes transmission and reception with the corresponding user equipment in the half-duplex mode or the full-duplex mode, in operations S2040 and S2050.

As described in FIGS. 8, 10, 11, 12, 15, 16, 17, 18, and 19, when transmission mode capability information is set for each band or each component carrier, the base station executes transmission and reception with the corresponding user equipment in the half-duplex mode or full-duplex mode, based on information set for each band/component carrier, in operations S2040 and S2050.

When transmission and reception is executed based on the half-duplex mode, the base station may transmit, to the user equipment, information indicating that a conflicting subframe is to be muted.

Figure 21:
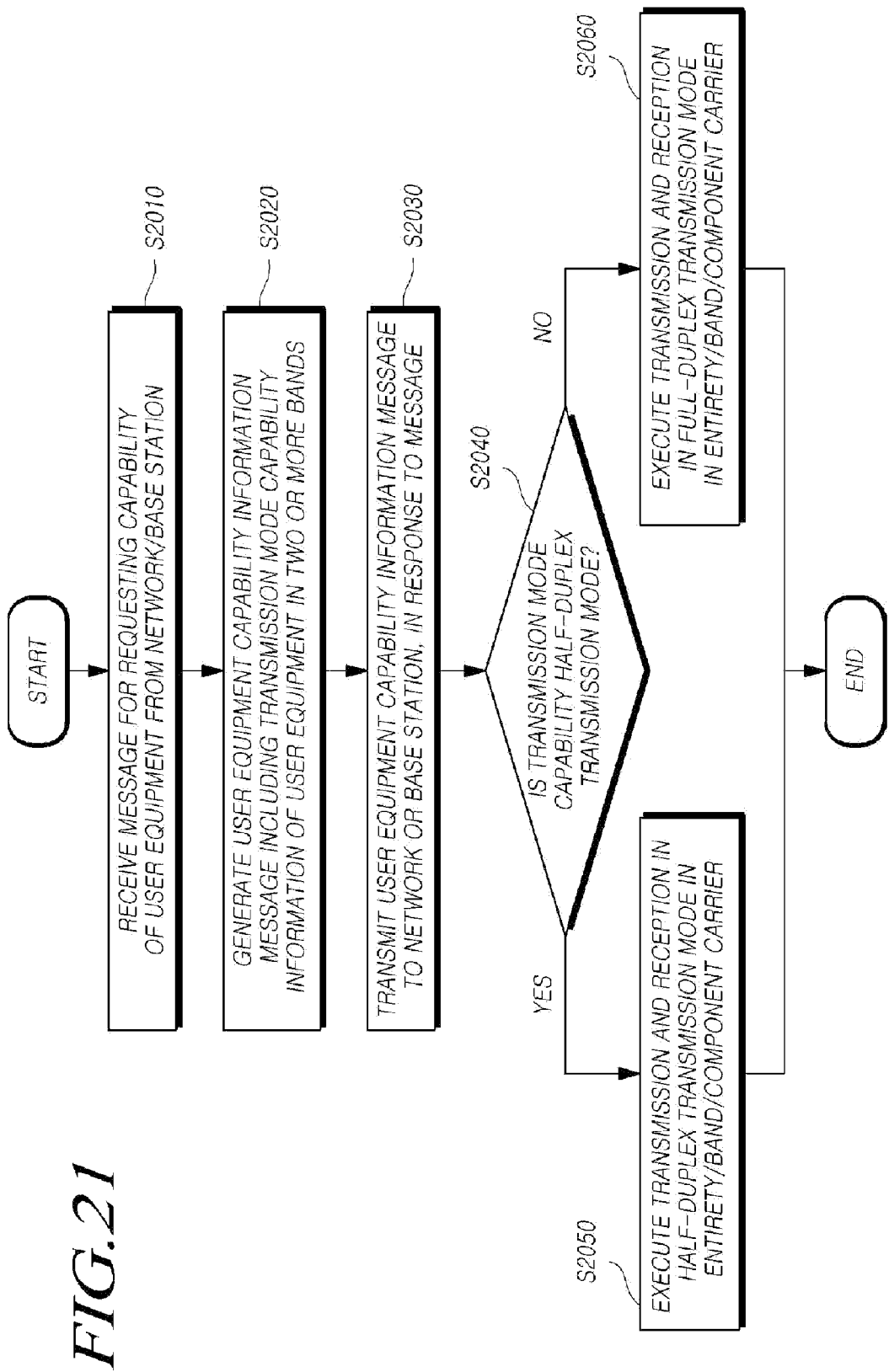
FIG. 21 is a diagram illustrating a process of transmitting transmission mode information of a user equipment based on an inter-band TDD transmission mode according to an embodiment of the present invention.

FIG. 21 is a diagram illustrating a process of transmitting transmission mode information of a user equipment based on an inter-band TDD transmission mode according to an embodiment of the present invention.

FIG. 21 may be executed in a user equipment that transmits or receives data to/from a base station or network that controls two or more bands set in different TDD (Time Division Duplex) configurations, or an apparatus that is coupled to the user equipment. First, a user equipment receives a message for requesting the capability of the user equipment from a network or a base station that controls two or more bands set in different TDD (Time Division Duplex) configurations, in operation S2110. UECapabilityEnquiry, which has been described above, may be used as a configuration of the received message. The user equipment generates a user equipment capability information message including the transmission mode capability information of the user equipment in two or more bands, in operation S2120.

The transmission mode capability information includes information associated with whether the user equipment operates in a full-duplex mode or a half-duplex mode in the two or more bands, and the schemes including the transmission mode capability information or the implementing processes based on the same have been described in FIGS. 7 through 18.

According to the schemes of FIGS. 7, 8, and 14, a field that directly indicates the full-duplex or half-duplex transmission mode or a field indicating the field may be included, as the transmission mode capability information, in UE-EUTRA-Capability information element (Information Element) that forms the user equipment capability information message. This is the scheme of reporting a transmission mode of a user equipment using a predetermined field. Also, the transmission mode capability information may be indicated by a value of ue-Category that indicates a category among the fields of the UE-EUTRA-Capability information element (Information Element) that forms the user equipment capability information message.

Also, according to the scheme of FIGS. 8, 10, 11, 12, 15, 16, 17, 18, and 19, the transmission mode capability information may be included in a field that sets information associated with two or more bands, in "UE-EUTRA-Capability-v1020-IEs" which is a field extended from the UE-EUTRA-Capability information element (Information Element) that forms the user equipment capability information message. In this example, the transmission mode supportable in a corresponding band or corresponding component carrier may be controlled.

The user equipment transmits the user equipment capability information message to the network or base station in response to the message, in operation S2130.

Subsequently, the user equipment may execute transmission and reception of data with the network or base station, based on the transmitted transmission mode capability information. That is, the transmission and reception scheme may be set based on whether the transmission mode capability is the half-duplex transmission mode (operation S2140) or not. That is, as described in FIGS. 7, 8, and 14, when the transmission mode capability information of the user equipment is set, the user equipment may execute transmission and reception with a base station/network in the half-duplex mode or the full-duplex mode, in operations S2150 and S2160.

As described in FIGS. 8, 10, 11, 12, 15, 16, 17, 18, and 19, when transmission mode capability information is set for each band or component carrier, the user equipment executes transmission and reception with the base station in the half-duplex mode or full-duplex mode, based on the information set for each band/component carrier, in operations S2150 and S2160.

When transmission and reception is executed based on the half-duplex mode, the user equipment may receive, from the base station, information indicating that a conflicting subframe is to be muted.

Figure 22:
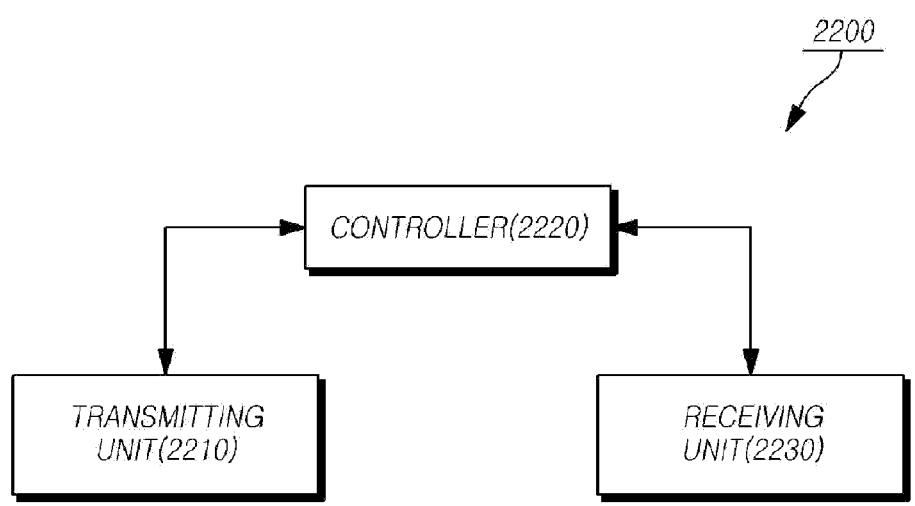
FIG. 22 is a diagram illustrating a configuration of an apparatus for receiving transmission mode information of a user equipment in an inter-band TDD transmission mode, according to an embodiment of the present invention.

FIG. 22 is a diagram illustrating a configuration of an apparatus for receiving transmission mode information of a user equipment in an inter-band TDD transmission mode, according to an embodiment of the present invention.

The diagram 2200 may indicate a base station that controls two or more bands set in different TDD (Time Division Duplex) configurations, or an apparatus that is coupled to the base station. The diagram 2200 of FIG. 22 will provide descriptions by exemplifying a base station. A transmitting unit 2210, a controller 2220, and a receiving unit 2230 are included as component elements.

The transmitting unit 2210 transmits, to a user equipment, a message for requesting the capability of the user equipment. UECapabilityEnquiry, which has been described above, may be used as a configuration of the transmitted message. In response to the message, the receiving unit 2230 receives, from the user equipment, the user equipment capability information message including transmission mode capability information of the user equipment in the two or more bands.

The transmission mode capability information includes information associated with whether the user equipment operates in a full-duplex mode or a half-duplex mode in the two or more bands, and the schemes including the transmission mode capability information or the implementing processes based on the same have been described in FIGS. 7 through 18.

According to the schemes of FIGS. 7, 8, and 14, a field that directly indicates the full-duplex or half-duplex transmission mode or a field indicating the field may be included, as the transmission mode capability information, in UE-EUTRA-Capability information element (Information Element) that forms the user equipment capability information message. This is the scheme of reporting the transmission mode of a user equipment using a predetermined field. Also, the transmission mode capability information may be indicated by a value of ue-Category that indicates a category among the fields of the UE-EUTRA-Capability information element that forms the user equipment capability information message.

Also, according to the scheme of FIGS. 8, 10, 11, 12, 15, 16, 17, 18, and 19, the transmission mode capability information may be included in a field that sets information associated with two or more bands, in "UE-EUTRA-Capability-v1020-IEs" which is a field extended from the UE-EUTRA-Capability information element (Information Element) that forms the user equipment capability information message. In this example, a transmission mode supported in a corresponding band or corresponding component carrier may be controlled.

The controller 2220 determines whether the transmission mode capability is the half-duplex transmission mode, and sets a carrier aggregation environment of the user equipment to correspond to the transmission mode capability information of the user equipment capability information message. That is, as described in FIGS. 7, 8, and 14, when the transmission mode capability information is set for the user equipment, transmission and reception may be executed with the corresponding user equipment in the half-duplex mode or the full-duplex mode.

As described in FIGS. 8, 10, 11, 12, 15, 16, 17, 18, and 19, when transmission mode capability information is set for each band or component carrier, transmission and reception may be executed with the corresponding user equipment in the half-duplex mode or full-duplex mode, based on information set for each band/component carrier.

When transmission and reception is executed based on the half-duplex mode, the base station may transmit, to the user equipment, information indicating that a conflicting subframe is to be muted.

Figure 23:
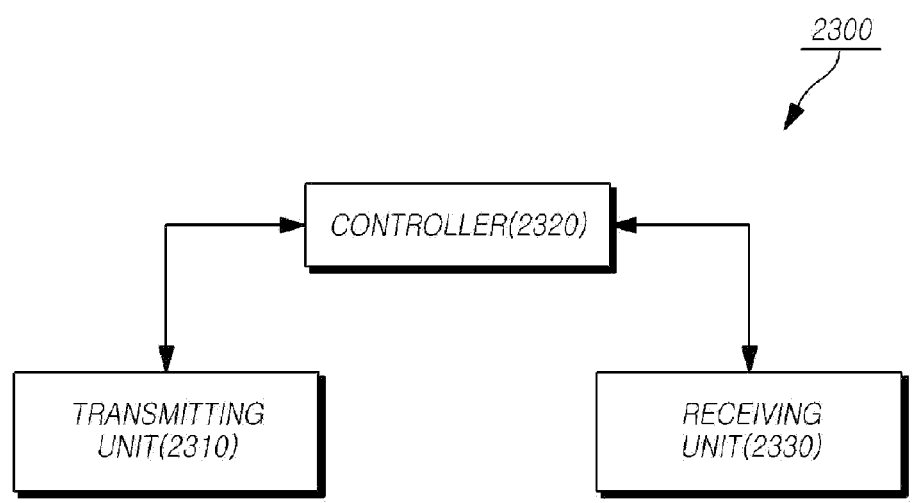
FIG. 23 is a diagram illustrating a configuration of an apparatus for transmitting transmission mode information of a user equipment in an inter-band TDD transmission mode according to an embodiment of the present invention.

FIG. 23 is a diagram illustrating a configuration of an apparatus for transmitting transmission mode information of a user equipment in an inter-band TDD transmission mode according to an embodiment of the present invention.

The diagram 2300 indicates a user equipment that transmits or receives data to/from a base station or network that controls two or more bands set in different TDD (Time Division Duplex) configurations, or an apparatus that is coupled to the user equipment. Hereinafter, it is assumed to be a user equipment, and each component element will be described. A transmitting unit 2310, a controller 2320, and a receiving unit 2330 are included as component elements.

The receiving unit 2330 receives a message for requesting the capability of the user equipment from a network or a base station that controls two or more bands set in different TDD (Time Division Duplex) configurations. UECapabilityEnquiry, which has been described above, may be used as a configuration of the received message. The controller 2320 generates a user equipment capability information message, including the transmission mode capability information of the user equipment in two or more bands.

The transmission mode capability information includes information associated with whether the user equipment operates in a full-duplex mode or a half-duplex mode in the two or more bands, and the schemes including the transmission mode capability information or the implementing processes based on the same have been described in FIGS. 7 through 18.

According to the schemes of FIGS. 7, 8, and 14, a field that directly indicates the full-duplex or half-duplex transmission mode or a field indicating the field may be included, as the transmission mode capability information, in UE-EUTRA-Capability information element (Information Element) that forms the user equipment capability information message. This is the scheme of reporting the transmission mode of a user equipment using a predetermined field. Also, the transmission mode capability information may be indicated by a value of ue-Category that indicates a category among the fields of the UE-EUTRA-Capability information element (Information Element) that forms the user equipment capability information message.

Also, according to the scheme of FIGS. 8, 10, 11, 12, 15, 16, 17, 18, and 19, the transmission mode capability information may be included in a field that sets information associated with two or more bands, in "UE-EUTRA-Capability-v1020-IEs" which is a field extended from the UE-EUTRA-Capability information element (Information Element) that forms the user equipment capability information message. In this example, a transmission mode supported in a corresponding band or corresponding component carrier may be controlled.

The transmitting unit 2310 transmits the user equipment capability information message to the network or base station in response to the message.

Subsequently, the user equipment may execute transmission and reception of data with the network or base station, based on the transmitted transmission mode capability information. The controller 2320 sets the transmission and reception scheme based on whether the transmission mode capability is the half-duplex transmission mode or not. That is, as described in FIGS. 7, 8, and 14, when the transmission mode capability information of the user equipment is set, the user equipment may execute transmission and reception with a base station/network in the half-duplex mode or the full-duplex mode.

As described in FIGS. 8, 10, 11, 12, 15, 16, 17, 18, and 19, when transmission mode capability information is set for each band or component carrier, the user equipment executes transmission and reception with the base station in the half-duplex mode or full-duplex mode, based on information set for each band/component carrier. When transmission and reception is executed based on the half-duplex mode, the user equipment may receive, from the base station, information indicating that a conflicting subframe is to be muted.

According to the schemes as described above, muting information may be transmitted to UEs that operate in a half-duplex transmission mode on a conflicting subframe in an inter-band CA (TDD) and, thus, the UE operation may be implemented more reliably.

That is, in the present specifications, when carrier-aggregated CCs are aggregated in different bands under an inter-band CA, different TDD UL-DL configurations may be embodied. A corresponding user equipment may execute the transmission in a full-duplex/half-duplex mode based on a transmission mode supportable for a conflicting subframe in which a UL subframe and a DL subframe conflict (miss match) on different CCs due to the different TDD UL-DL configurations, or a transmission mode supported in a corresponding band or a component carrier. Particularly, to this end, an embodiment of the present specification enables a user equipment to execute signaling to a base station using a UE-EUTRA-Capability information element (Information Element).

Although a preferred embodiment of the present invention has been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of a base station for transmitting a signal to a user equipment using two or more bands set in different TDD (Time Division Duplex) configurations, the method comprising:
   transmitting, to a first user equipment supporting different TDD configurations of an inter-band carrier aggregation, an enquiry message for a user equipment capability, and transmitting, to a second user equipment that does not support an inter-band carrier agreement, an enquiry message for a user equipment capability;
   receiving a user equipment capability information message including transmission mode information of the first user equipment, in response to the enquiry message transmitted to the first user equipment, wherein the transmission mode information of the first user equipment includes information indicating whether the first user equipment operates in a full-duplex mode or a half-duplex mode in two or more bands set in different TDD configurations of an inter-band carrier aggregation;
   in response to the enquiry message transmitted to the second user equipment, receiving, from the second user equipment that does not support an inter-band carrier agreement, a user equipment capability information message that does not include transmission mode information of the second user equipment in UE Capability Information Element (IE) of the second user equipment;
   determining the different TDD configurations of an inter-band carrier aggregation for the first user equipment according to a report of the transmission mode information of the first user equipment;
   transmitting, to the first user equipment, control information for configuring component carrier aggregation comprising component carriers using the two or more bands; and
   transmitting a signal to the first user equipment through the component carrier aggregation according to the transmission mode information,
   wherein the transmission mode information of the first user equipment is included in UE Capability IE of the first user equipment.

2. The method as claimed in claim 1, wherein the UE Capability IE of the first user equipment corresponds to a UE-EUTRA-Capability information element (IE), and the UE-EUTRA-Capability information element includes information about at least one band combination among the two or more bands.

3. The method as claimed in claim 2, wherein the transmission mode information corresponds to the band combination.

4. A method of a user equipment for receiving a signal from a base station using two or more bands set in different TDD (Time Division Duplex) configurations, the method comprising:
   receiving, by the user equipment supporting different TDD configurations of an inter-band carrier aggregation, an enquiry message for a user equipment capability from the base station;
   transmitting a user equipment capability information message, including transmission mode information of the user equipment, in response to the enquiry message, wherein the transmission mode information includes information indicating that the user equipment operates in a full-duplex mode in two or more bands set in different TDD configurations of an inter-band carrier aggregation;
   receiving, from the base station, control information for configuring component carrier aggregation comprising component carriers using the two or more bands; and
   receiving a signal from the base station through the component carrier aggregation according to the transmission mode information,
   wherein the transmission mode information is included in UE Capability Information Element (IE) of the user equipment if the user equipment supports a half-duplex mode but selects the full-duplex mode.

5. The method as claimed in claim 4, wherein the UE Capability IE of the first user equipment corresponds to a UE-EUTRA-Capability information element (IE), and the UE-EUTRA-Capability information element includes information about at least one band combination among the two or more bands.

6. The method as claimed in claim 5, wherein the transmission mode information corresponds to the band combination.

7. A base station to transmit a signal to a user equipment using two or more bands set in different TDD (Time Division Duplex) configurations, the base station comprising:
   a transmitter to transmit, to a first user equipment supporting different TDD configurations of an inter-band carrier aggregation, an enquiry message for a user equipment capability, and to transmit, to a second user equipment that does not support an inter-band carrier agreement, an enquiry message for a user equipment capability;

a receiver to receive, from the first user equipment, a user equipment capability information message including transmission mode information of the first user equipment, in response to the enquiry message transmitted to the first user equipment, and to receive, from the second user equipment that does not support an inter-band carrier agreement, a user equipment capability information message that does not include transmission mode information of the second user equipment in UE Capability Information Element (IE) of the second user equipment, in response to the enquiry message transmitted to the second user equipment, wherein the transmission mode information of the first user equipment includes information indicating whether the first user equipment operates in a full-duplex mode or a half-duplex mode in two or more bands set in different TDD configurations of an inter-band carrier aggregation; and a controller to determine the different TDD configurations of an inter-band carrier aggregation for the first user equipment according to a report of the transmission mode information of the first user equipment, and to configure a component carrier aggregation comprising component carriers using the two or more bands, wherein the transmission mode information of the first user equipment is included in UE Capability IE of the first user equipment, wherein the transmitter transmits a signal to the first user equipment through the component carrier aggregation according to the transmission mode information.

8. The base station as claimed in claim 7, wherein the UE Capability IE of the first user equipment corresponds to a UE-EUTRA-Capability information element (IE), and the UE-EUTRA-Capability information element includes information about at least one band combination among the two or more bands.

9. The base station as claimed in claim 8, wherein the transmission mode information corresponds to the band combination.

10. A user equipment to receive a signal from a base station using two or more bands set in different TDD (Time Division Duplex) configurations, the user equipment comprising:

a receiver to receive, from the base station, an enquiry message for a user equipment capability, and to receive control information for configuring component carrier aggregation comprising component carriers using two or more bands set in different TDD configurations of an inter-band carrier aggregation, wherein the user equipment supports different TDD configurations of an inter-band carrier aggregation;

a controller to generate a user equipment capability information message including transmission mode information of the user equipment in the two or more bands, wherein the transmission mode information includes information indicating that the user equipment operates in a full-duplex mode in the two or more bands; and a transmitter to transmit the user equipment capability information message, in response to the enquiry message, wherein the transmission mode information is included in UE Capability Information Element (IE) of the user equipment if the user equipment supports a half-duplex mode but selects the full-duplex mode, and wherein the receiver receives a signal from the base station through the component carrier aggregation according to the transmission mode information.

11. The user equipment as claimed in claim 10, wherein the UE Capability IE of the first user equipment corresponds to a UE-EUTRA-Capability information element (IE), and the UE-EUTRA-Capability information element includes information about at least one band combination among the two or more bands.

12. The user equipment as claimed in claim 11, wherein the transmission mode information corresponds to the band combination.

* * * * *